Aug. 31, 1937.    N. J. CONRAD    2,091,430
ELECTRICAL PROTECTIVE SYSTEM AND METHOD
Filed July 24, 1930    10 Sheets-Sheet 1

Inventor:
Nicholas J. Conrad
By: [signature] Attys

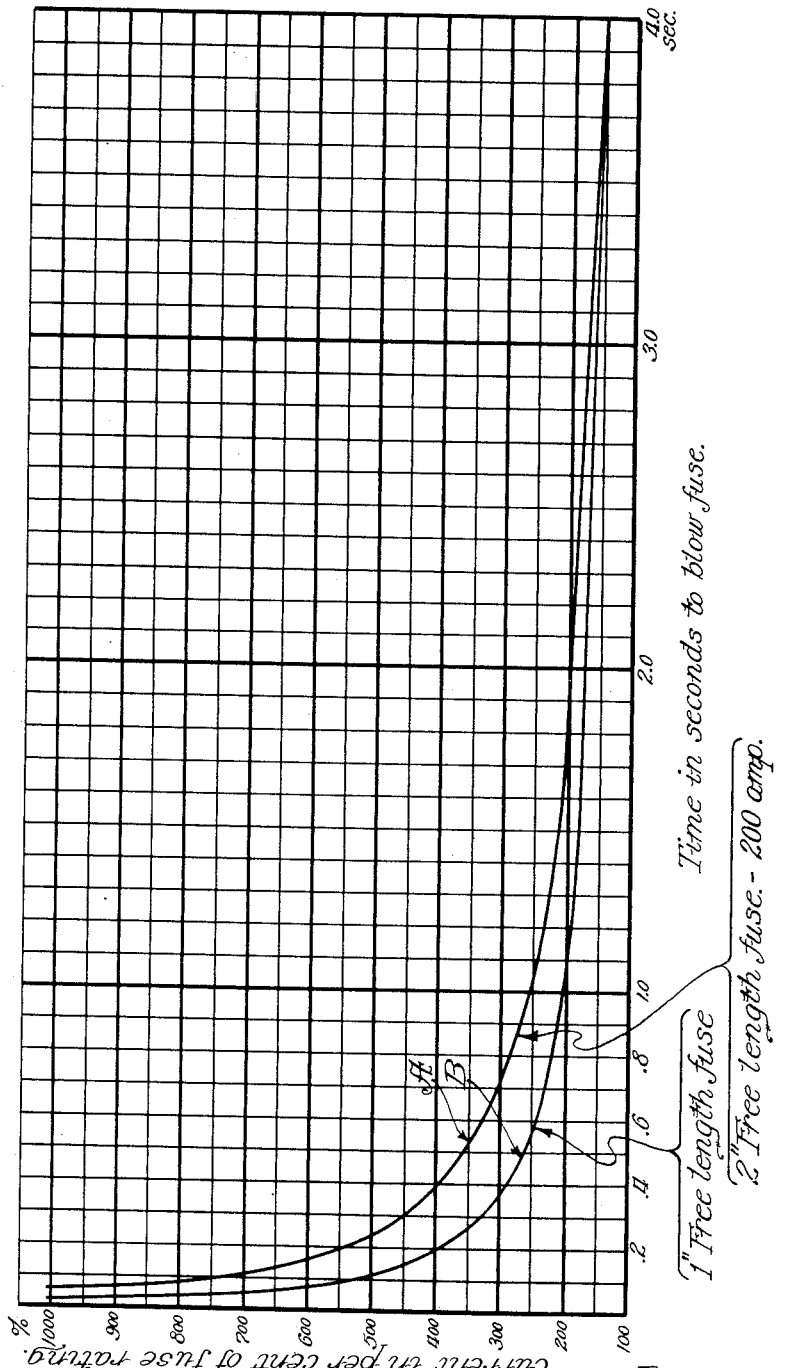

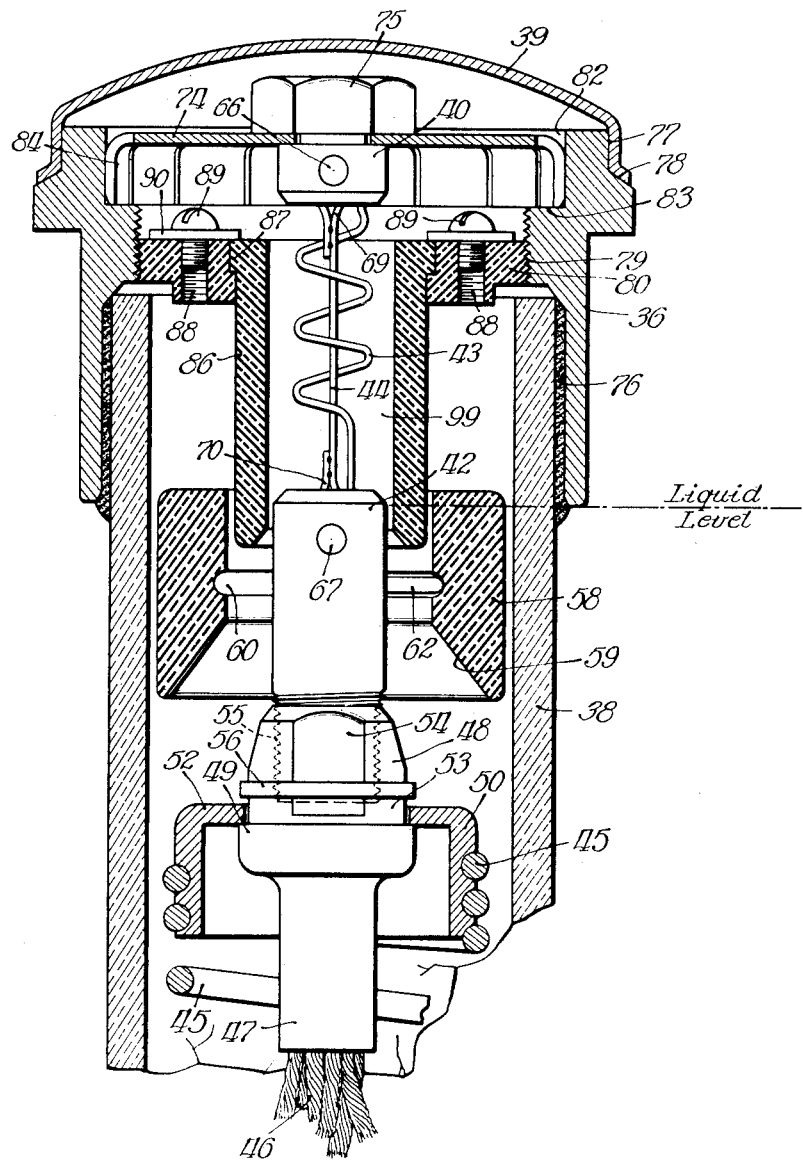

Aug. 31, 1937.    N. J. CONRAD    2,091,430
ELECTRICAL PROTECTIVE SYSTEM AND METHOD
Filed July 24, 1930    10 Sheets-Sheet 4
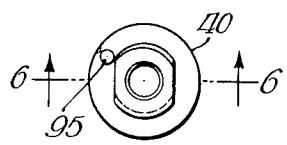
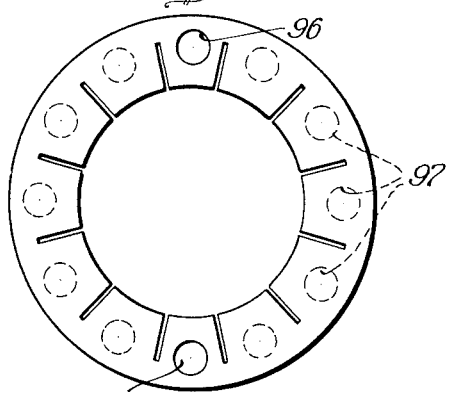
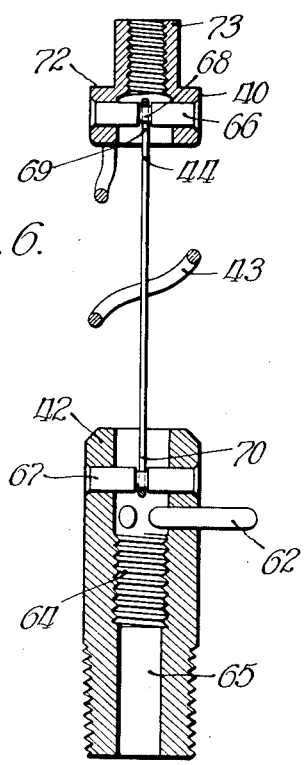
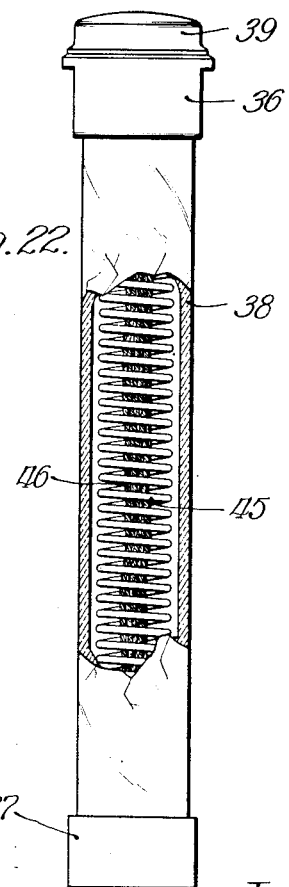
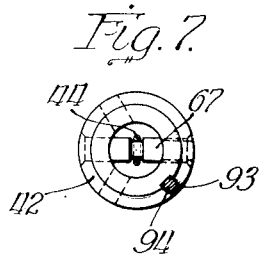
Inventor:
Nicholas J. Conrad
By: Brown, Jackson, Boettcher & Dienner
Attys.

Aug. 31, 1937.    N. J. CONRAD    2,091,430
ELECTRICAL PROTECTIVE SYSTEM AND METHOD
Filed July 24, 1930    10 Sheets-Sheet 5
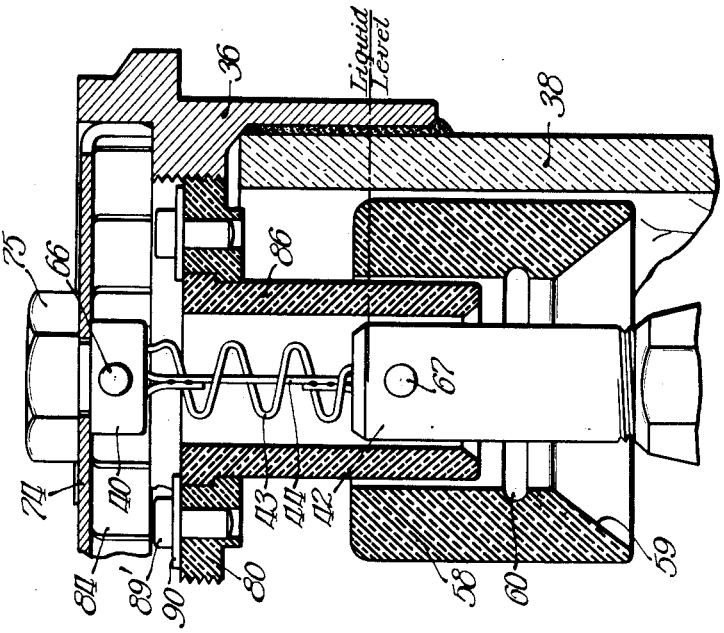
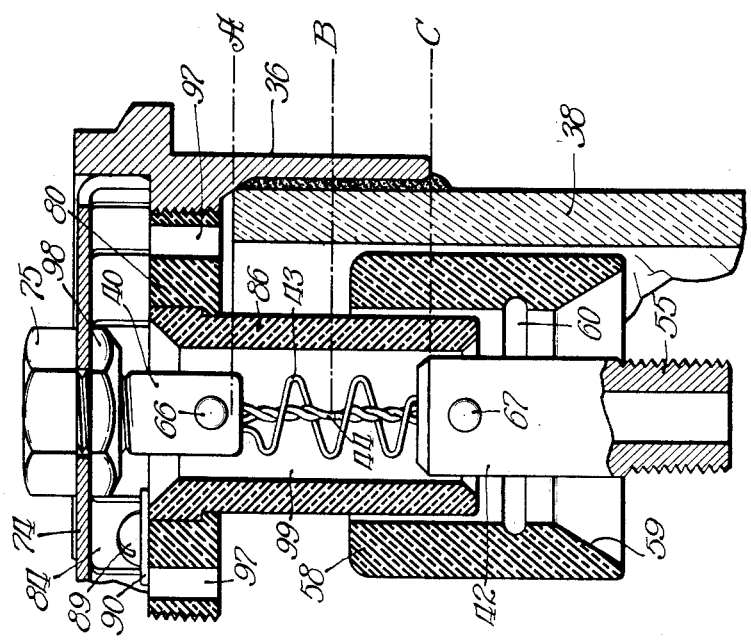
Inventor:
Nicholas J. Conrad
By:
Brown, Jackson, Boettcher & Dienner
Attys.

Aug. 31, 1937.    N. J. CONRAD    2,091,430
ELECTRICAL PROTECTIVE SYSTEM AND METHOD
Filed July 24, 1930    10 Sheets-Sheet 6
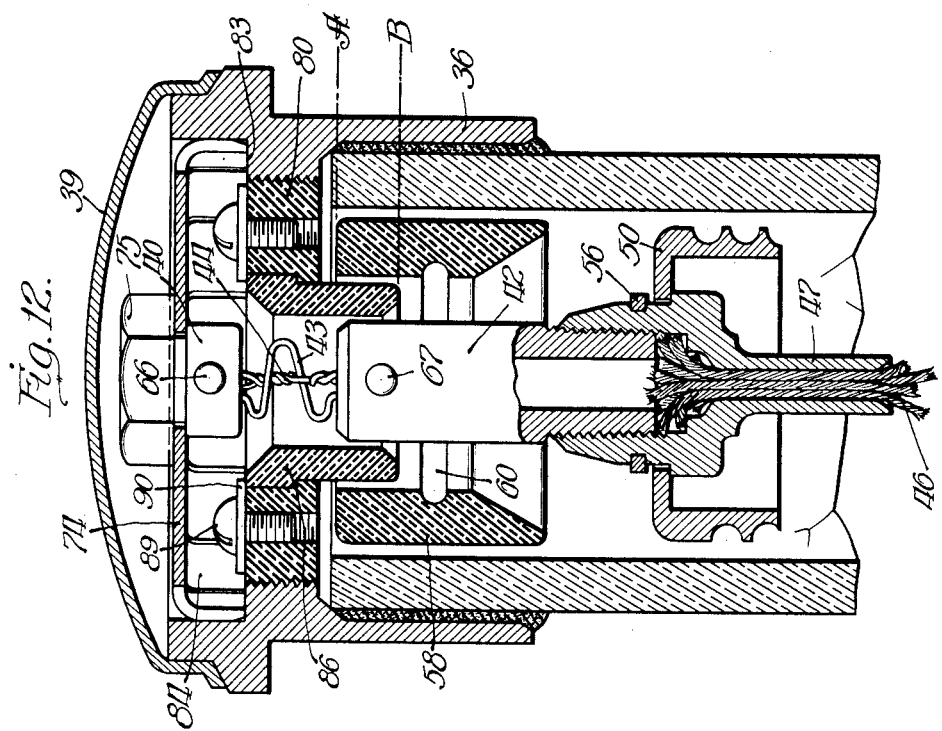
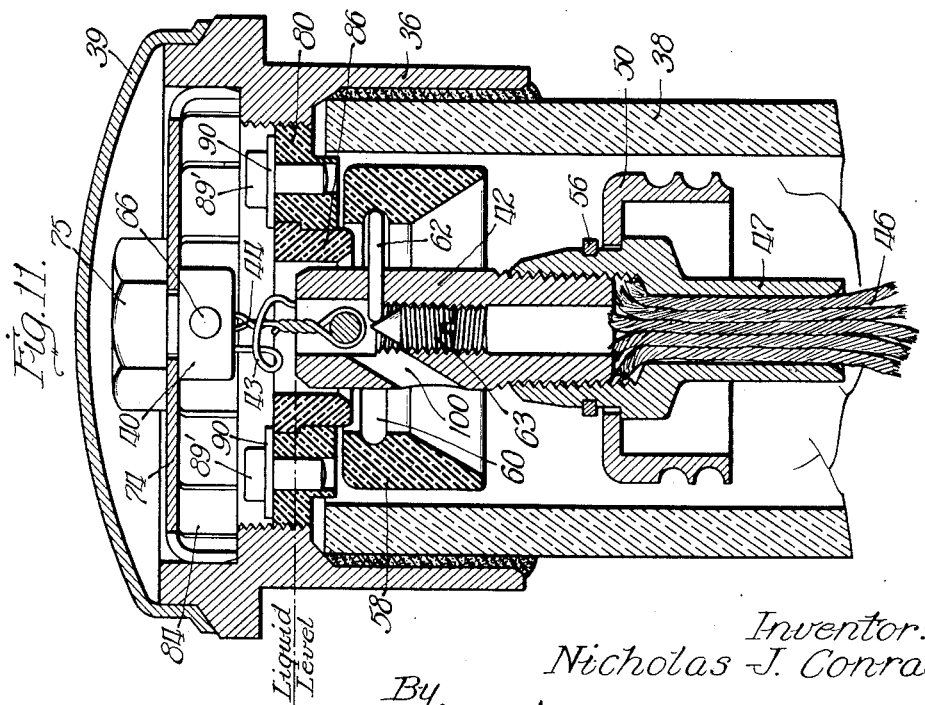
Inventor:
Nicholas J. Conrad
By Brown, Jackson, Boettcher & Dienner
Attys.

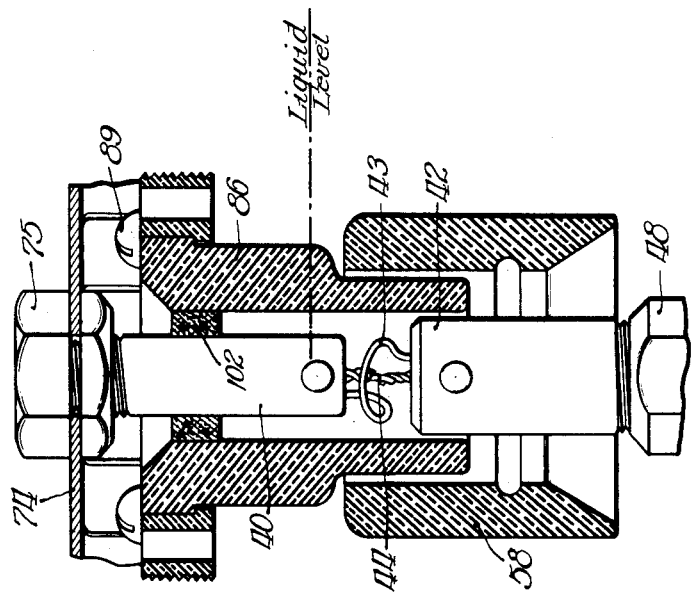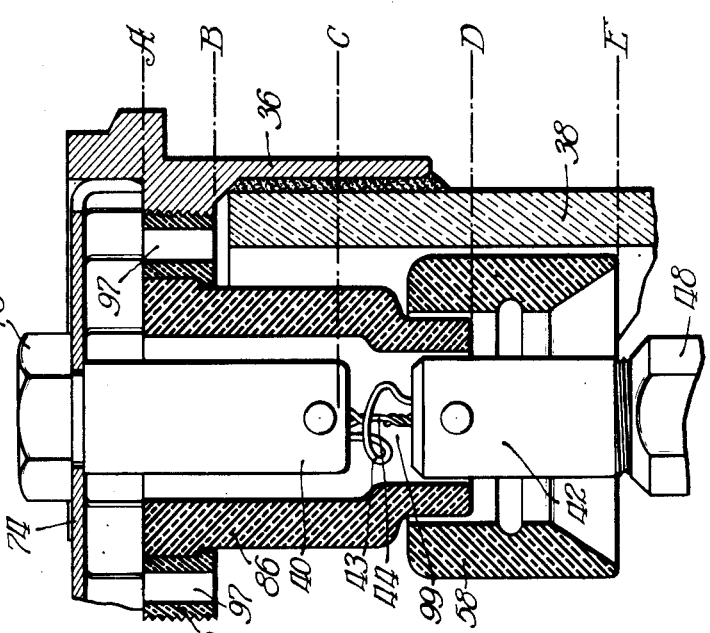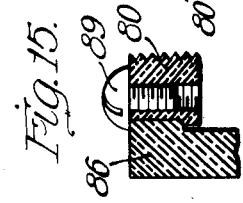

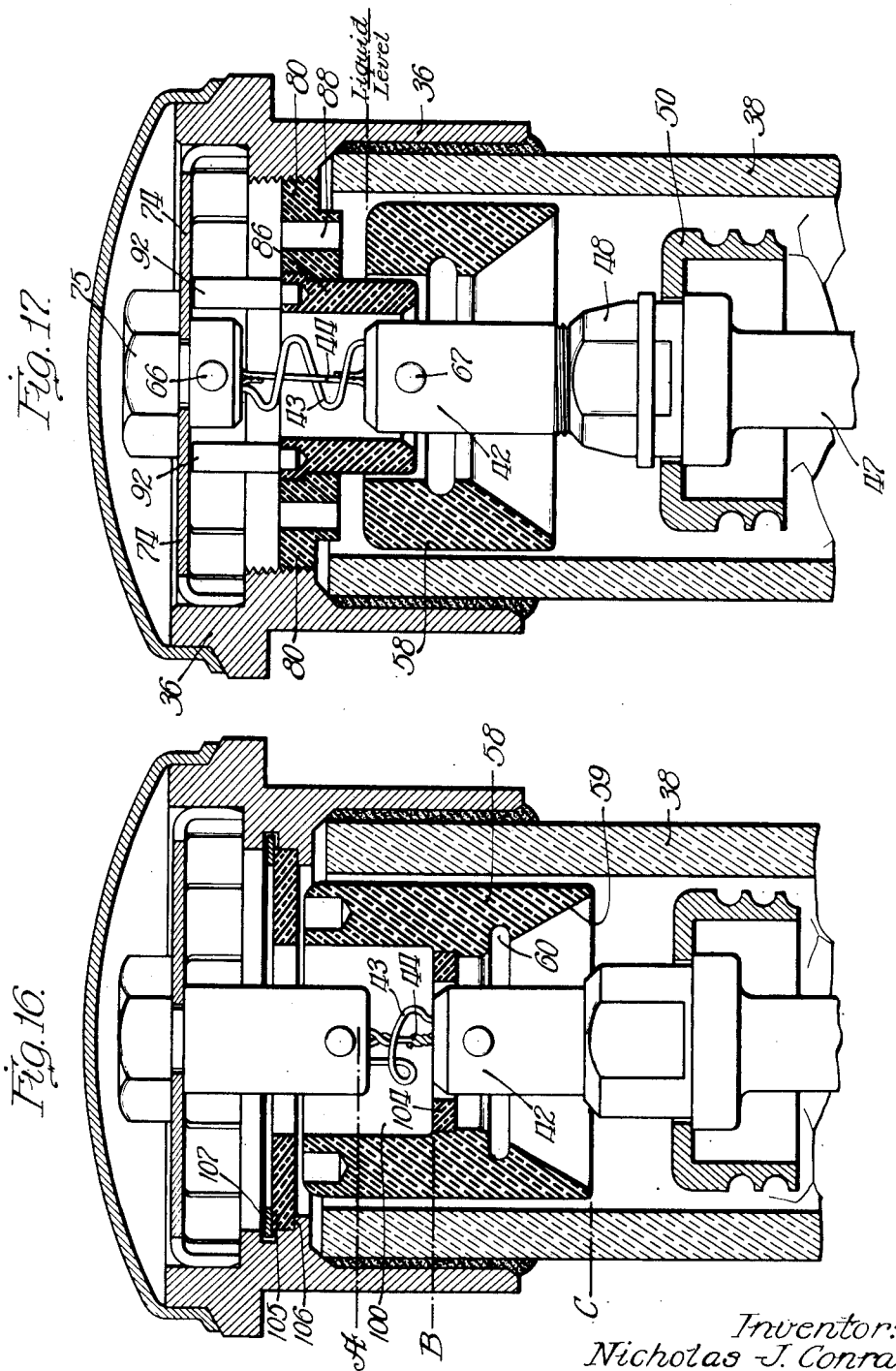

Aug. 31, 1937.   N. J. CONRAD   2,091,430
ELECTRICAL PROTECTIVE SYSTEM AND METHOD
Filed July 24, 1930   10 Sheets-Sheet 9
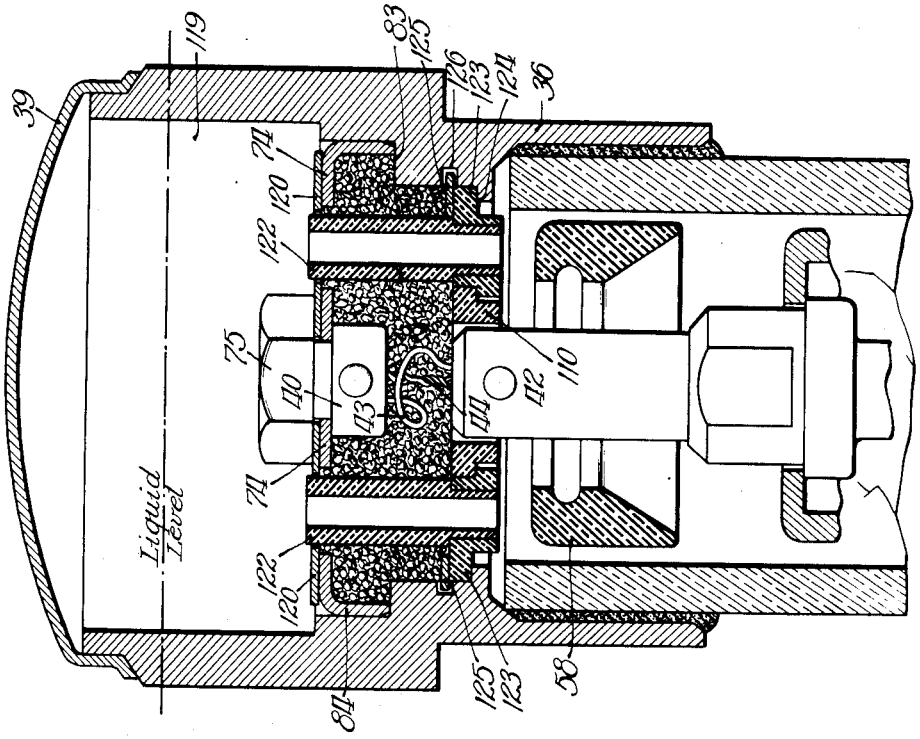
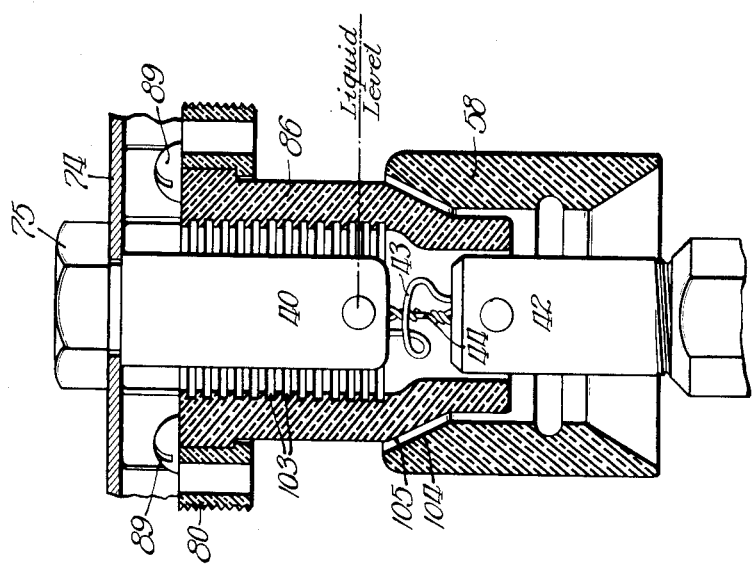
Inventor:
Nicholas J. Conrad
By:
Brown, Jackson, Boettcher & Dienner
Attys.

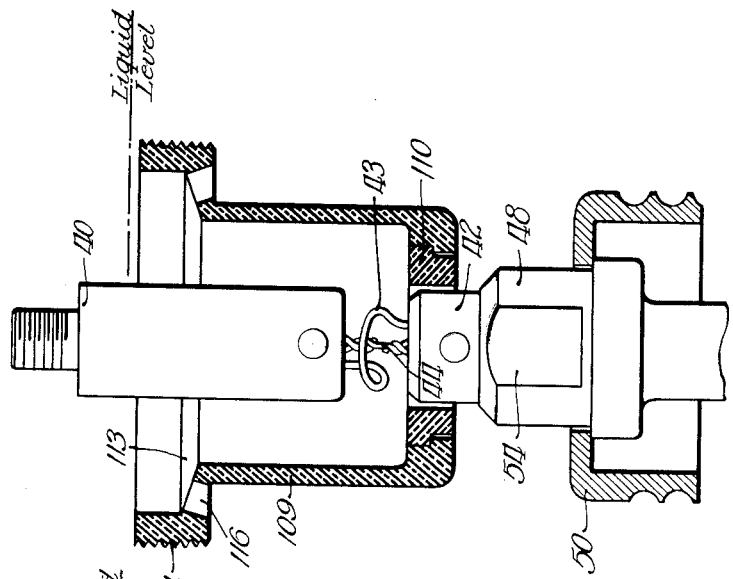
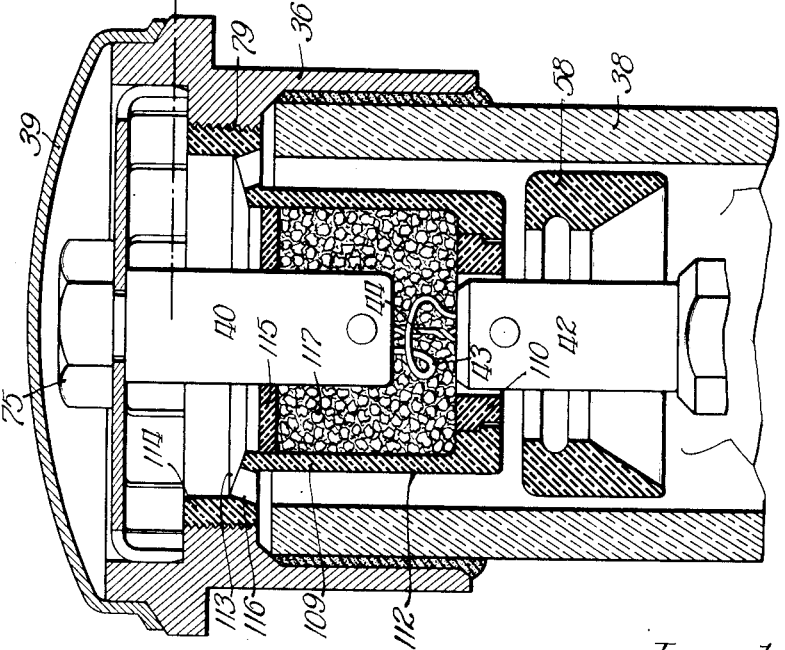

Patented Aug. 31, 1937

2,091,430

UNITED STATES PATENT OFFICE 2,091,430

ELECTRICAL PROTECTIVE SYSTEM AND METHOD

Nicholas J. Conrad, Winnetka, Ill., assignor to Schweitzer & Conrad, Inc., Chicago, Ill., a corporation of Delaware Application July 24, 1930, Serial No. 470,416

99 Claims. (Cl. 200—117)

My invention relates to an electrical protective system and method.

In the evolution of the practice of electrical generation and distribution there is a known tendency to concentrate the generation in units and plants of great capacity, and to increase the area of distribution and the number of consumers.

As viewed from the standpoint of the engineer, looking to the protection of the system against damage from excessive current flow or, more properly speaking, power flow, every line and every consumer is a possible short circuit upon the entire system. And in such a system, a short circuit upon the system means that a greater investment in the generating station is subject to destruction and a wider area and greater number of customers are subject to loss of current supply.

As the circuits are subdivided towards the individual outlets, or consumers, the ability to create a dangerous short upon the system is naturally diminished because of the greater reactance which is included and the less carrying capacity of the conductors. However, except for the above inherent limitations, the entire power of an immense generating system is available at every outlet.

It is customary now to protect such a system by the use of oil circuit breakers, progressively increasing in capacity from the customers, or the low potential side, towards the generators, and arranged to operate successively according to a definite time schedule, so as to disturb only so much of the service as it is necessary to do in order to disconnect the fault.

In a system of this character the energy repression charge per kilowatt capacity tends to increase enormously, due to the excessive cost of oil circuit breakers of sufficient capacity and capability to disconnect from the system any part thereof, and of a capability of coordination to secure the action as above described.

It has heretofore been proposed to employ fuses for the protection of all or part of such a system against short circuits. Low voltage fuses for protecting house wiring, motor circuits and the like are in universal use and serve as a most important means of preventing damage from excessive power flow. In the protection of high voltage circuits, fuses have not been so generally used as their reliability, as now developed, would tend to warrant. This is largely because oil circuit breakers are required for switching under load and they are, then, generally employed in conjunction with relay circuits for protective purposes.

Another difficulty which has been encountered is that the Schweitzer & Conrad liquid quenched fuse, as heretofore constructed, operates with extreme rapidity; so rapidly, in fact, that a fuse on the high voltage side will operate, in many cases, to open the circuit before an oil circuit breaker on the low voltage side can disconnect a shorted circuit.

This great rapidity of operation is one of the greatest virtues of this type of fuse because it tends to stop the flow of energy before too much heat is developed.

Because of this great rapidity of operation it is found not infrequent, in cases of a short circuit on some part of the low tension network, for a fuse on the high tension side to open before a circuit breaker on the low tension side can open, resulting in a more widespread interruption of service than should be caused from the nature of the disturbance.

Also, in like cases of short circuit in the low tension network, it has occurred that fuses on the high tension side have opened before fuses on the low tension side have opened, resulting in like wider interruption than is necessary. Also, sometimes, fuses on both the low tension side and the high tension side go out, when only the fuse on the low tension side should go out.

The reason for this undesirable action in case of the oil switch is due to the fact that the time current characteristics of the fuse are not correlated with those of the switch. Likewise, in the case of the fuse on the high tension side operating ahead of, or at the same time as the fuse on the low tension side, this is due to the fact that heretofore, so far as I have been able to determine, no means has been known to control the time overload characteristics of a fuse of this, or any other character.

I have discovered a mode of controlling the time overload characteristics of a fuse so that the fuses in a system, or any number of systems, may have the same operating characteristics and be able to disconnect faults progressively, depending upon their severity.

Consider the conduction of power from the source, such as the generator buses, to the consumer, to pass through conductors of successively less current carrying capacity. These conductors have, included therein, fuses of successively less power carrying capacity. Upon the occurrence of a short circuit or excessive current flow, it is desired to have the fuse adjacent the consumer blow ahead of the fuse adjacent the source.

According to my invention I correlate the time overload characteristics of all the fuses in the system so that for a short occurring anywhere in the system the fuse next in line towards the source will open ahead of the fuse further along towards the source. Also, according to my invention, the characteristics may be so correlated as to permit the operation of an oil circuit breaker to occur before the supporting fuse behind it will blow.

Oil circuit breakers now in common use are much slower than fuses heretofore constructed. There is a definite development in the art looking to the speeding up of oil circuit breaker operation. Also, switching devices other than oil circuit breakers are being developed to give more speedy operation. As these switching devices are improved the timing of the operation of the fuses of my invention may be speeded up accordingly.

It is not difficult to make the Schweitzer & Conrad liquid quenched fuse operate quickly. The difficulty has heretofore been to provide a control which will keep such fuses from acting too quickly. This control has been provided by my present invention and therefore I can now make the fuses in a system operate according to a predetermined time overload characteristic, and thereby selectively disconnect only that part of a system which must be disconnected to insure safety.

It can be seen that by my invention greater safety is secured and non-interruption of the service promoted.

The means thus securing the time overload control depends upon a discovery which I have made, namely, that in a fuse, given a fusible element of a certain rated current carrying capacity, (and this is based on the minimum and long time blowing current which is recognized in the art as the basis for rating, and which is never a sharply determinable value) the time within which a certain overload will blow the fusible element is a function of the length of the fusible element of the given capacity. For increases in length, it is necessary, generally, to increase the diameter somewhat in order to keep the rated capacity. This is influenced to some extent by the cooling effect of the terminals and perhaps other factors.

Now, according to my present invention I vary the length of the fuse wire in order to increase or decrease the time that intervenes before a certain overload will cause the fuse to operate to open the circuit.

Also, I find that the character of the surrounding medium controls the rating of the fuse and the time overload characteristics.

I provide means for controlling the medium surrounding the fuse which, in conjunction with the length of fuse wire, gives the desired characteristics.

My invention also provides numerous other improvements in fuses which, while shown in a specific embodiment, namely, the liquid quenched type, are not to be limited to that specific type of fuse as they are useful in other types of fuses. Certain of these improvements are as follows:

1. A novel form of upper releasable terminal which is preferably formed as an inverted cup with the flange thereof slotted. This provides better contact and greater conductivity between the external terminals or ferrules and the internal terminal to which the fusible link is connected and it permits of securing this support with a minimum loss of axial length of the fuse mechanism. A practical result of this construction is less heating of the upper end of the fuse device and consequently improved operating characteristics.

2. A separate explosion chamber for relieving the glass sleeve from the shock and heat of the initial violence of the arc upon the explosion of the fusible element.

3. A novel disposition of the fuse wire to accommodate wires of different length.

4. A novel form of universal mounting for the strain wire.

5. A novel form of spring attachment for preventing disengagement of the spring from the movable arcing terminal.

6. A novel releasable mounting for the tubular wall of the explosion chamber.

7. A novel venting system and vent for pressure below the explosion chamber.

8. Novel means for keeping the fuse out of contact with the liquid, so as to keep substantially uniform the conditions of operation and more definitely determine the point of blowing.

9. A novel system of progressively releasing the pressure as the arcing contacts are separated.

10. A novel method of controlling and confining the generation and flow of gaseous medium evolved from the arc extinguishing material by the heat of the arc to cause such gaseous medium to sweep metallic vapors out of the space occupied by the arc into an adjacent space, and thereby substitute and maintain an atmosphere of low arc-sustaining ability between the terminals.

There are numerous other improvements in structure and mode of operation which will be more apparent from the following specification and claims.

Now in order to acquaint those skilled in the art with the manner of constructing and operating a system and devices embodying my invention I shall describe in conjunction with the accompanying drawings a specific embodiment of the same.

In the drawings:

Figure 3 is a chart illustrating the time power characteristics of the fuses employed in the system shown in Figs. 1 and 2;

Figure 4 is a vertical section through the upper end of a fuse embodying my invention;

Figure 5 is a top plan view of the upper arcing terminal;

Figure 6 is a vertical sectional view through the arcing terminals showing the attachment of the strain wire;

Figure 7 is a top plan view of the lower arcing terminal;

Figure 8 is a top plan view of the release plate for controlling the venting of pressure in the fuse casing;

Figure 9 is a fragmentary vertical sectional view through the upper end of the working parts of the fuse showing the fuse as supported lower in the explosion chamber than in Figure 4;

Figure 10 is a view similar to Figure 9, showing a modification of the structure of Figure 4;

Figure 11 is a vertical sectional view through the upper end of a modified form of fuse showing the explosion chamber as shortened up to accommodate the shorter length of fuse wire;

Figure 12 is a view substantially like that of Fig. 11, showing the manner of accommodating a longer length of fuse wire;

Figure 13 is a vertical fragmentary section showing a modified form of explosion chamber and terminals to correspond;

Figure 14 is a similar view of a different form of fuse chamber and terminal;

Figure 15 is a fragmentary detail showing a modified manner of mounting the sleeve forming the explosion chamber;

Figure 16 is a vertical section through the upper end of a modified form of fuse;

Figure 17 is a similar view of a modified form showing a different arrangement for holding the sleeve forming the explosion chamber in place;

Figure 18 is a fragmentary vertical sectional view similar to that shown in Figures 13 and 14, showing means for agitating the fluid discharge through the explosion chamber;

Figure 19 is a vertical sectional view through the upper end of a fuse of my invention showing the fuse and strain wire as shielded by a body of insulating material such as cork and showing also a modified venting system;

Figure 20 is a similar view through the upper end of a fuse showing a modified form of explosion chamber wherein the chamber is normally filled with ground cork or the like;

Figure 21 is a fragmentary vertical section through the upper end of a fuse in which the explosion chamber is like that shown in Fig. 20 and may be provided with the filling of cork or otherwise, but in this modification the liquid director is omitted;

Figure 22 is a side elevational view of a fuse of my invention with a part of the glass sleeve forming the fuse casing broken away to reveal the tension spring and the stranded flexible conductor.

Throughout this specification like reference numerals are employed for designating like parts to facilitate identification.

Figure 1:
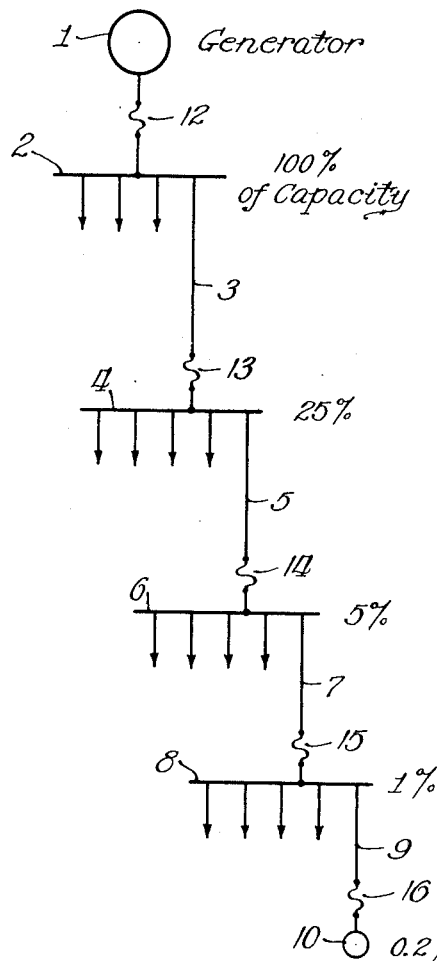
Figure 1 is a diagram of an electrical distribution system embodying my invention.

The fuses herein specifically illustrated and described are of the type shown, for example, in my prior Patent No. 1,743,322 of January 14, 1930, although it is to be distinctly understood that the inventions herein disclosed and claimed are not to be limited to the liquid quenched type of fuse.

A fuse of the present type involves three general features; first, a fusible link between two arcing terminals; second, means for separating these two arcing or fuse terminals upon the blowing of the fusible element; and third, the production of a quenching effect.

The arc extinguishing or quenching function may be an incident to the separation of the terminal or it may be secured by the expansion of the surrounding medium within the fuse chamber with the consequent increase of fluid pressure and the quenching effect secured thereby. It may also be increased by the velocity of discharge of gases or other fluids from the container where the same is permitted to open, or is intentionally left open.

The fuse of my present invention provides two stages of operation. The fuse casing provides two functionally distinct spaces, or chambers, one being a relatively constricted or reduced chamber which is termed the fuse chamber, or explosion chamber, and the other is an expansion chamber. The fuse or explosion chamber opens into the expansion chamber so that the metallic vapors generated by blowing of the fusible link and the gas and vapor released or generated by the action of the arc upon the arc extinguishing medium can flow into the expansion chamber. In the embodiments herein shown expansion chambers of various sizes are illustrated, and their actions differ somewhat, as will be explained more at length hereafter.

The fuse of my invention is designed to operate when the rating thereof is substantially exceeded. However, the fuse must be capable of operating under overloads which differ very widely in degree. That is to say, the fuse must interrupt the flow of current from a bare excess of rating to the full capacity of the system to force current therethrough. Viewed from another angle, the fuse must interrupt the current flow whether the drop across its terminals be only so much as will produce a current flow in excess of rating or whether it be the full voltage of the system. This means an extremely wide range of current flow, and consequently arcs of a correspondingly wide range of severity. It may be accepted that the size of the arc is proportional to the current flow.

For overloads in the lower ranges, the device of my invention operates preferably wholly within the closed fuse casing, i. e., operates without venting to atmosphere, but for the higher ranges a different action comes into play. The limited space provided by the explosion chamber and its connected expansion chamber tends to cause the internal pressure to rise rapidly. The pressure in the explosion chamber rises due to the formation of the arc therein, and the action of the arc upon the arc extinguishing medium in contact with the same. Immediately the pressure difference between the explosion chamber and the expansion chamber creates a high velocity flow of the fluids including the metallic vapors and the gases and vapors generated by the arc from the explosion chamber to the expansion chamber, tending to equalize the pressures in both chambers. The more limited the free gas or air space in the expansion chamber, the quicker will be the pressure rise therein. This pressure is found to be beneficial in de-activating the conducting character of the matter which forms the arc, thereby tending to stop current flow therethrough. Hence, on low overloads, the sweeping out of the metallic vapors and the action of the arc extinguishing material in contact with the arc, and the increase of pressure, are sufficient to deactivate the conducting matter of the arc and, together with the lengthening of the arc, stop current flow entirely within the casing, that is, without removing the vent cap. By increasing the expansion chamber space a more sustained motion, and hence, higher velocity, may be secured, but this is secured with less rapid rise in pressure. The chamber formed in the upper ferrule tends to cool and condense the metallic vapors and the gases and vapors discharged into it from the arcing chamber 99. This action is promoted by the heat conductivity of the metal forming the chamber, as well as the metal parts therein.

If, however, the overload and the corresponding arc are of such severity as to raise the pressure to values higher than the casing is designed to sustain, the safety vent or vent cap is blown off, and thereupon two actions occur; first, the internal pressure tends to be released with considerable violence, giving a quick and violent flow of fluids from the expansion chamber and its communicating explosion chamber, with a highly beneficial deactivating effect upon the arc; second, by venting the expansion chamber to a region of lower pressure, i. e., the atmosphere, a sustained flow of very high velocity may be secured, which brings more of the arc extinguishing medium within the influence of the arc to be acted upon, continuously sweeps out metallic vapors, and which, by the violence of motion, tends to create a turbulence within the arc and to deactivate the substance of the arc which conducts the current. The ionized gas and vapor discharged into the chamber above the explosion chamber is cooled and condensed by contact with the metallic walls and through the effect of increased pressure therein before the cap is removed. If the arc is so severe as to blow off the cap, the expansion of the gases and vapors results in a cooling, condensation and dispersion which deactivates or deionizes the gaseous medium discharged from the chamber 99.

In both stages of action, the separation of the terminals by the action of the spring both lengthens the arc and brings more of the arc extinguishing material into operating relation with the arc, so that there is a continued violent sweeping out of metallic vapors or other ionized fluids. Also, the separation establishes a definite separation of the conducting parts, which prevents reestablishment of the arc after it is once interrupted.

The chief desideratum in a fuse is reliability of operation. From the very nature of the device a fuse cannot operate sharply at the same load under all conditions because the blowing of the fusible element depends upon heat accumulation to cause fusion of the element. Since heat accumulation depends upon a great number of factors which cannot all be controlled it is too much to expect that a fuse will stand under 99% of load and wait indefinitely for a load to reach 100% rating before the fuse blows. Conversely, it is not to be expected that when the load attains 100% of the fuse rating for a very short time that the fuse will immediately open. As a practical matter, the best that can be guaranteed is an approximation which is entirely satisfactory because electrically operated devices, in general, will withstand temporary overloads without damage and are well able, within their limitations, of standing full load continuously.

One of the greatest difficulties in fuses of the type above referred to has been to coordinate their action in a system so that where, for example, in a distribution system, a series of fuses of progressively increasing capacity in leads of increasing importance towards the source have been subjected to the effect of a short circuit acting upon them in series, the fuse of greater capacity would wait for the fuse of less capacity to clear the short before the fuse of greater capacity operated.

Consider the diagram of Fig. 1 and that the generator 1 supplies a bus 2 with a certain amount of power which can be represented as 100 percent. This power may be distributed through four main lines like the line 3, each carrying a quarter of the full capacity of the generator, or 25% of the load. This line 3 in turn leads to the bus 4, from which a series of five lines such as line 5 radiate outwardly and in turn supply a bus 6, having a series of lines such as 7, carrying each one fifth of the power supplied to the bus 6 and said lines, in turn, supplying leads or buses 8 with individual lines 9 leading to the consumer, such as 10. This diagram does not represent an actual system, but is merely explanatory. Now suppose that the system operates at the same voltage throughout and is merely a distribution system from the generator 1 to the consumer 10. In the line between the generator 1 and the bus 2 a fuse 12 is provided, this fuse being of a capacity suitable for carrying 100% of the generator load continuously, and being adapted to blow upon carrying considerable excess of its capacity. In the lines such as 3, fuses 13 are connected. Since the line 3 is intended to carry only 25% of generator capacity, the fuse 13 is likewise of a rated current carrying capacity of 25% of full generator load. In the line 5 a fuse 14 is provided and this, since it needs to carry only 5% of the generator capacity has proportional current carrying capacity. The line 7, likewise, is provided with a fuse 15 which, in this case, is of a current carrying capacity of 1% of the full generator load. The line 9 to the customer 10 is provided with a fuse 16 which is of a rated capacity of $\frac{1}{10}$ of 1% of the full generator load.

Now assume that at the customer's terminal 10 a full short circuit is accidentally caused. While the carrying capacity of the intervening lines does not permit of all of the current flow passing to the short circuit at 10, and the other connections are to be considered in determining the probable current flow, it is not at all unusual for the current flow to reach five times normal full load. Assume, therefore, that the short circuit at 10 reaches a current flow of five times normal load. Five times the normal load of the fuse 16 would equal the capacity of the fuse 15. In other words, a 500% load on the fuse 16 imposes a 200% load on the fuse 15. Also it can be seen that a 200% load on the fuse 15 causes the load in fuse 14 to rise 20% and the load in fuse 13 to rise 4%.

If, for example, the fuse 16 should not clear the short circuit before the fuse 15 blows, or before the fuse 14 blows, a very considerable part of the service may be interrupted by such operation. Also, if the short circuit should occur on the bus 6 it can be seen that unless the fuse 14 clears the short the fuses 13 and 12 may blow, with the consequently greater extent of interruption and possible damage.

According to the present invention I construct the fuses in a system such as that indicated diagrammatically in Figure 1 so that they all operate on substantially the same time overload characteristics. That is to say, I make the fuses in a system such as shown in Figure 1 all to correspond to substantially the same time overload characteristics, so that a fuse of less capacity will invariably operate ahead of a fuse of greater capacity.

Referring now to Figure 3, wherein I have shown a chart carrying the curves A and B, I construct the fuses of different capacities so that their characteristics will follow a curve like A. Curve A is plotted on coordinates having time in seconds as the abscissae and current in percent of fuse rating as the ordinates.

Figure 2:
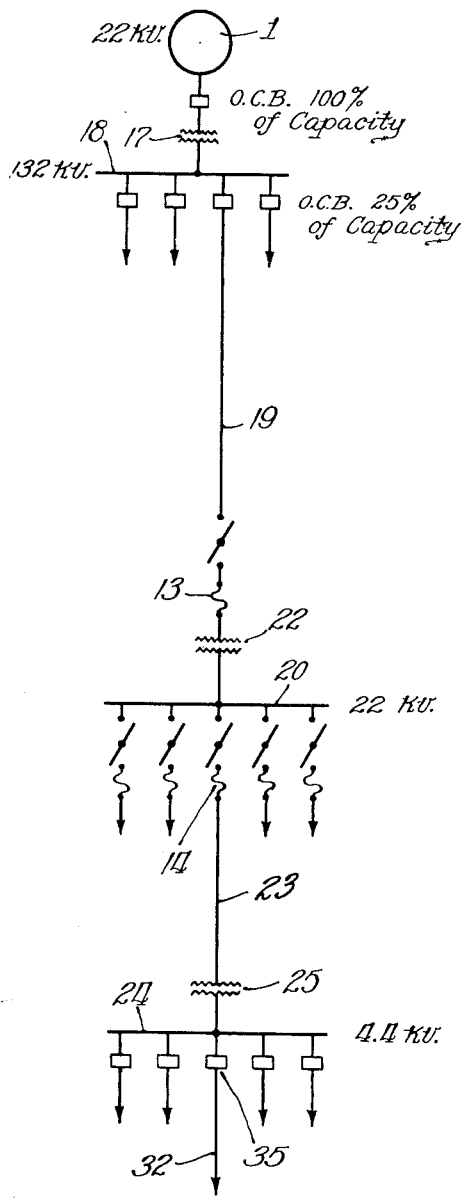
Figure 2 is a similar diagram illustrating the application of my invention in a system of distribution employing various transmission voltages.

A system like that shown in Figure 1 will not be found in practice, since the same voltage will not be employed throughout a distribution system to any appreciable extent. An actual system will be constructed more as indicated in the diagram of Figure 2, where the generator 1 will generate current at a certain voltage, for example 22 kv. and this current will be stepped up by a transformer 17 so that the bus 18 will be maintained at a much higher voltage suitable for transmission, such, for example, as 132 kv. and the transmission line 19 thereupon leads to a remote substation where a bus 20 is maintained at a lower voltage, say 22 kv. through the intermediary of the transformer 22. From the substation a line 23 leads to a distribution center having a bus 24 at 4400 volts through a transformer 25. This distribution center leads to the customers' premises.

These figures are, of course, only by way of example, and not actual instances.

Now it can be seen that the current flow in fuses such as 13 and 14 will be modified by the voltages on which the corresponding lines operate. However, the curves of Figure 3 are plotted in percent and not actual current values. Hence, fuses of small actual current carrying capacities at high voltages may transmit much more power than fuses of large carrying capacity at lower voltages.

The problem which I have solved, therefore, is not merely the controlling of the timing of a certain carrying capacity in terms of current, but in terms of power. Since fusion is, however, a function of current, it will be seen that a relatively complex problem is presented.

Furthermore, in a system such as indicated in Figure 2 it is customary to provide oil circuit breakers as indicated by the small rectangles, for switching purposes.

It is desirable, when circuit breakers are employed in conjunction with fuses to let the circuit breakers operate automatically and the fuses to act as reserve protection for the reason that a circuit breaker may be reclosed more readily than a fuse replaced. For example, consider the circuit breaker 35 on the low tension side of transformer 25 and the fuse 14 on the high tension side of said transformer. If a short should occur on the line 32 it would be desirable to have the oil circuit breaker 35 opened before the fuse 14 is blown, as a matter of convenience in re-establishing the circuit, but it is also highly desirable that the circuit breaker operate to disconnect the shorted line before the fuse 14 on the high tension side operates, for blowing of the fuse 14 would deprive the distribution center of current. It is therefore desirable that the timing of the fuses be in each case made, as nearly as possible, so great as to permit the intervening operation of an oil circuit breaker before the fuse opens the circuit.

I have been able, in fuses of my design, to operate according to curve B so as to secure the desired selective action as between fuses, but fuses operating according to the characteristic curve B work too fast, in most cases, to permit the intervening operation of an oil circuit breaker. By my present design, wherein I am able to increase the time before blowing occurs it is now possible to permit circuit breakers of present design to open the line before the fuse is compelled to operate. Consider, for example, that around 400% current rating and above, the time has been substantially doubled. Since present designs of circuit breakers can operate at approximately $\frac{1}{10}$ of a second on 500% load, it will be seen that for all loads less, the fuses of my present invention provide ample time for the circuit breaker to open the line before the fuse is blown.

The manner in which I secure the control of the time element and particularly increase the time between application of the overload and blowing of the fuse will now be explained in conjunction with certain constructions embodying my improvements.

Referring particularly to Fig. 22 the present fuse is constructed as a generally elongated cylindrical body having metal ferrules 36 and 37 secured upon the upper and lower ends of a glass sleeve 38. The upper ferrule is formed with an open top which is closed by a cap 39 adapted to be removable under certain circumstances involved in the operation of the fuse. The sleeve, ferrules and cap thus form a closed chamber or casing within which is contained a body of arc extinguishing liquid. Suitable arcing, or fuse terminals such as 40 and 42 (see Fig. 4) are connected by a fusible link 43 and held in definite relation with respect to each other by the strain wire 44. A tension spring 45 is connected between the movable terminal 42 and the ferrule 37 and a flexible conductor or cable 46 serves as a current carrying conductor between the movable terminal 42 and the lower ferrule or external terminal 37.

The upper end of the flexible conductor 46 is fastened in a tubular socket 47, this socket having a head 48 at its upper end, provided with an annular shoulder 49. A flanged ring 50, which is grooved on its outer periphery to receive the coils of the spring 45 has the inwardly extending flange 52 loosely embracing the cylindrical portion 53 above the shoulder 49. The head 48 is provided on opposite sides with flat, wrench engaging surfaces 54, and has a central axial threaded socket 55 into which is threaded the cylindrical arcing terminal member 42. A retaining ring 56 which may be a split spring ring is seated in an annular groove above the flange 52 so as to prevent disengagement of the head 48 and the flanged ring 50. The lower end of the conductor 46 and spring 45 are anchored on the inside of the lower ferrule 37 by a similar flanged ring and head, or may be otherwise secured thereto electrically and mechanically. The flexible conductor 46 is of high conductivity to shunt the spring 45 to prevent any serious flow of current therethrough which would injure the spring. At the same time it is sufficiently soft and flexible to be readily collapsed by the tension spring 45.

The stud 42 which is shown in section in Figures 6 and 11 has means for securing thereto the liquid director 58, the form of which director and the location of the same being subject to considerable variation as will appear hereafter. The liquid director 58 comprises a generally cylindrical short cylinder with a flared inlet opening 59 and a groove 60, by means of which it is mounted upon the arcing or fuse terminal 42. The groove 60 is engaged by a series of pins 62, three in number in the preferred form, which pins have their ends rounded and the outer ends pressed into the groove 60 by an expanding screw 63 (see Fig. 11) which is a pointed grub-screw carried in the threads 64 within the bore 65 of the terminal 42.

The upper terminal 40 and the lower terminal 42 are provided with transverse holes near their adjacent or facing ends, and in these holes pins 66 and 67, respectively, are mounted. The pin 66 is identical with the pin 67. It has a groove 68 formed at the central portion thereof, this groove lying substantially on the axis of the corresponding terminal. The supporting strain wire 44 is provided with loops 69 and 70 at its end, these loops being formed by doubling back the wire and fastening the ends either by twisting, electric welding or the like. The strain wire 44 is preferably of nickel chromium iron which may be purchased on the market as "Nichrome", or "Chromel", or under other names, and it is of very high mechanical strength and of high electrical resistance. The function of the loops such as 69 and 70 and the grooves 68 in the pins 66 and 67 is to provide a universal joint of limited motion to permit of convenient handling and assembly without injurious stresses being exerted upon the strain wire. Also, if any vibration is set up during shipment or use of the fuse, the play permitted by this coupling prevents injury to the strain wire.

The upper terminal 40 has a lower head portion 72 and a threaded stem portion 73, the upper end of which has a threaded socket for the attachment of a tool used to draw the stem through the hole in plate 74. The stem 73 has its sides slabbed off to provide a means for holding the same against rotation. This stem passes through the central non-circular opening in the flanged plate 74. The non-circular opening holds the stem 73 against rotation to permit the clamping nut 75 to be threaded upon the stem 73 and to draw the head 40 against the bottom of the plate 74. This provides good mechanical and electrical connection between the upper stud or terminal 40 and the plate. The pins 66 and 67 are held in place by battering or riveting over the metal around the hole over the end of the pin or the end of the pin over the metal around the edge of the hole.

The upper terminal or ferrule 36 is provided with a cylindrical socket into which the upper end of the glass sleeve 38 is placed and secured by means of a metal or other seal 76 providing a somewhat elastic fluid-tight joint.

The sides of the upper terminal 36 and likewise of the lower terminal 37 are slabbed off to provide parallel contact surfaces for the engagement of a suitable fuse mounting of the type shown in my prior Patent No. 1,665,446.

The upper end of the ferrule 36 is provided with a cylindrical seal portion 77 and a conical shoulder portion 78 engaged by corresponding portions of the cap 39 and sealed with cementitious material of suitable character to maintain a fluid-tight joint which will not deteriorate when exposed on the inside to arc extinguishing liquid such as carbon tetrachloride nor to external weathering as by water. On the interior of the terminal 36 there is a threaded bore 79 for receiving a threaded mounting plate 80 which is preferably made of bakelite, this plate being apertured at the center so that it has the form of a ring, which may be termed a barrier ring.

Figure 23:
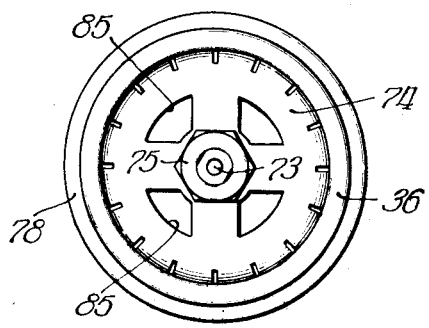
Figure 23 is a top plan view of the fuse with cap removed.

Above the threaded portion 79 there is a counterbore 82 terminating in a radially extending shoulder 83. The terminal plate 74 which is preferably of hard copper or brass has a cylindrical flange 84 suitably slotted so as to provide spring fingers. The plate may be provided with apertures 85, as shown in Figure 23, to permit the equalization of pressure upon opposite sides thereof, the plate when thus completed looking somewhat like a spider. The spring fingers 84 have their lower outer ends slightly chamfered off so that they may be forced into the counterbore 82 to provide a resilient spring grip against the cylindrical surface of the counterbore and to rest against the shoulder 83.

The tension of the spring 45 is thus taken against the ends of the spring fingers 84 and the action of this force is to expand the flange plate to cause it to grip more securely the counterbore 82.

The bakelite ring 80 is provided with a central bore through which extends the fiber tube 86. This tube has a head 87 formed at its upper end and the central bore in the ring 80 has a counterbore for receiving the head 87. This head 87 appears as a flange extending outwardly from the surface of the tube 86. The ring 80 has a plurality of holes 88 therethrough and in some or all of these holes pins (either cylindrical or threaded) such as the screws 89 are mounted, and they hold under their heads bakelite washers 90 overhanging the flange or head 87 of the tube 86 to hold the tube yieldably in position. In the form shown in Figure 11 instead of having machine screws such as shown at 89 in Figure 4 I employ fiber pins 89' having suitable heads for holding the bakelite washers 90 in place.

If desired the tube such as 86 may be held in place by the tension of the spring 45 as shown for example in Figure 17 where posts 92 are set in the upper end of the tube 86 and extend upwardly into contact with the bottom surface of the plate or spider 74. In this event, however, a greater amount of opening through the ring 80 is provided.

The fusible conductor or link 43, in this case a piece of silver wire, is secured in the ends of the terminals 40 and 42 as by cutting a slot 93 in the cylindrical surface as shown in Figure 7 and then battering or riveting the edges of the slot over the end 94 of the fusible wire or as shown in Figure 5 by drilling a longitudinal hole in the end of the terminal 40 as indicated at 95 and then crushing in the walls of the hole as by means of a center punch or the like to grip the wire firmly in the socket thus formed. Such form of fastening is desirable as it is relatively unaffected by heat and since the slot or the hole, as the case may be, may be made much longer than the cross section of the fuse wire, ample conductively under all circumstances is readily assured. The fuse wire itself is coiled about the strain wire 44 and is disposed within the explosion chamber formed by the tube 86.

It is desirable in all cases to retain so much as possible, and particularly in the case of a violent blowing of the fuse, the initial action within the explosion chamber defined by the tube 86. Where the overload is not so great as to blow off the cap the pressure caused by action of the arc in the explosion chamber is retained by the limited space above the liquid, and particularly the free gas or air space above the tube 86 and barrier ring 80. But when the pressure created in the inside of the fuse casing reaches the value at which the cap 39 is set to operate, it opens to atmosphere. This tends to give a free discharge from the upper end of the fuse casing. It is desirable for the purposes of the present invention to produce within the explosion chamber a condition which will keep the metallic vapors formed by the arc at a minimum, maintain a medium of low conductivity in the explosion chamber, and pressure within the explosion chamber, or a part thereof, as high as may be possible, while at the same time securing through the explosion chamber, or at least the outer end thereof, a condition of high velocity flow and turbulence tending to deactivate the conducting substance of the arc. The upper end of the tube 86 is open above the ring 80 and the transmission of pressure to the space under the plate 74 and through the openings in the plate 74 to the cap 39 is relatively free. Nevertheless, there is not the violent muzzle blast that there has been previously in fuses where the explosion chamber is not provided. This explosion chamber is useful not only in the case of liquid filled fuses of this type but of the air expulsion type, for example, as shown in my prior Patent No. 1,466,423. In the fuse shown in Figure 4 the liquid level is normally carried about even with the top of the lower arcing contact 42 so that the fusible link 43 is disposed substantially above the liquid. Being thus enclosed in air the transmission of heat therefrom will be less rapid during normal operating conditions and the capacity of the fuse is not readily affected by variations in outside temperature. It is to be observed that the fusible link 43 is coiled in a helical coil about the strain wire 44. The fusible link 43 is highly conductive as compared to the strain wire and carries most of the current. As soon as the fusible wire 43 melts and an arc begins to form, the arc introduces sufficient resistance and also causes sufficient heat to cause the wire to be fused immediately.

As shown in Figure 4 the lower end of the coil of fuse wire 43 is left straight so that minor variations in liquid level which might occur due to variations in contents or changes in temperature would not seriously or appreciably affect the capacity of the fuse.

Assume that the fuse has been subjected to overload of sufficient amount to cause the fusible wire and the strain wire 44 to be melted and an arc to form. As soon as the metals have sufficiently softened to permit the tension of the spring to separate the terminal 42 from the terminal 40 the downward motion of the terminal 42 and liquid director 58 immediately begins. While this liquid director is not absolutely tight in the glass sleeve 38 it operates nevertheless like a piston, causing liquid to be projected upwardly through the annular space between the liquid director 58 and the terminal 42, playing upon the arc as the same is lengthened by the downward motion and tending to chill and quench the same.

The projection of liquid into the region of the arc and the movement of the terminal 42 downward into the liquid brings more of the arc extinguishing liquid within the influence of the arc, and vice versa. The action of the arc upon the liquid evolves vapor and gas under pressure and, since the lower part of the fuse casing is full of liquid, they cannot expand in that direction. They escape through the explosion chamber, sweeping out metal vapors and gases ionized by the arc. In Figure 4, the upper end of the casing is filled with air or other gas or gases, and into this space the gases and such entrained liquid as is carried along is discharged from within the explosion chamber to the said expansion chamber which is provided in the top of the casing, particularly the space between the barrier ring 80 and the cap 39. The free gas space in the explosion chamber and above the same cushions the shock of the initial blowing of the fuse. If the excess of load is relatively moderate, the raising of pressure within the explosion chamber 99, the driving out of the metallic vapors, and the rapid movement of gas from the explosion chamber to the expansion chamber will be adequate to put out the arc, but heavy overloads create an arc of such severity as to raise the pressure very rapidly and drive fluid, i. e., metal vapors, gases, and perhaps some liquid, into the expansion chamber so rapidly as to have substantially an explosive effect.

If the pressure generated by the blowing of the fuse is sufficient to remove the cap 39, the plate or spider 74 then bars the only free outlet from the explosion chamber 99 to atmosphere and if the violence of discharge is sufficient the plate or spider 74 and its terminal 40 will be discharged, leaving the outlet of the chamber 99 free to atmosphere. If the explosion is not too violent, the expulsion fuse action may be sufficiently effective upon the arc in the constricted explosion chamber to extinguish the same upon blowing off the cap, without much assistance from the arc extinguishing medium. In any event, the withdrawal of terminal 42 into the liquid separates the same from the region of the ferrule 36, to prevent reestablishment of the arc by the recovery voltage of the line. The expulsion of the spider 74 and upper terminal 40 does not, in case of a heavy arc, stop the arc, because the gases which are ionized or activated by the arc, and thereby rendered conductive, come into contact with the interior surfaces of the metal ferrule. Then the projection of fluids by the liquid director, and the projection of fluid by pressure generated by the lower end of the arc and the moving lower terminal into the chamber 99, results in the generation of a violent and turbulent flow, therethrough, tending to sweep out and deactivate the vapors and gases ionized by the arc. It is known that if such deactivation is sufficient to prevent the reestablishment of the circuit through the fuse after the cyclic current passes through the zero value, the arc may be stopped completely. If the arc is not extinguished in the stages above mentioned, a further continued action of greater arc extinguishing effect is called into play as the arc is lengthened. As the terminal 42 descends the arc will tend to create pressure below the explosion chamber and if this pressure is so serious as not to escape through the explosion chamber 99 and the holes through the ring 80 which are optionally provided, the tube 86 itself may be discharged by shearing off the washers 90.

The washers 90 have a definite holding strength which may be readily predetermined to permit the tube 86 to be expelled and greater freedom of outlet provided.

The tube 86 being of substantially greater length than the bore thereof, affords a very considerable restriction to the high rate of flow which is created. If the ionized gases of the arc cannot be expelled through the tube, and the holes through the ring 80, the tube 86 is expelled, and this provides an opening not only of greater diameter but of relatively short length. The arc, if it still persists between descending terminal 42 and any part of ferrule 36, is then increased in length and subjected to the action of the arc quenching liquid discharged thereupon. The pressure, sweeping action, and turbulent flow which result, finally deactivate the gases of the arc to the extent of causing cessation of current flow. The length of travel of the terminal and the amount of liquid present is designed to be capable of extinguishing the severest arc which may be encountered.

There are numerous ways in which the structure may be designed to permit the above described progressive release of the pressure if the same should arise in the glass tube, primarily for the purpose of preventing accidental breakage of the glass sleeve, which would permit the arc extinguishing liquid to escape and tend to cause failure.

In Figure 8 I have shown a form of release plate which may be placed over the openings in the ring 80 being held by pins or screws 89 extending through the openings 96—96, and the plate having slots cut on the inner periphery thereof to form resilient flaps over openings in the ring 80 to permit the escape of fluid through openings under the flaps indicated by the dotted circles 97 and to permit the tube such as 86 to shear off the resilient fingers or segments adjacent the holes 96, the other fingers permitting the escape of the tube 86 by being bent backward away from the tube.

For different effects the liquid level may be varied so as to contact to greater or less extent with the fuse wire and the strain wire, or a different medium such as ground cork or other material may be packed around the fuse wire to act both as a heat insulating medium and also to keep the arc extinguishing liquid or air away from circulating about said wires. The coils of the fusible wire should not be so close to each other as to touch or to effect too great an interchange of heat although this factor may be employed to insure blowing when a minor overload is maintained for too long a time.

In Figure 9 I have shown the upper terminal 40 as lengthened so as to extend into the interior of the tube 86 whereby a much more confining effect of the explosion chamber 99 is secured. The lengthened terminal 40 in Figure 9 permits the use of a clamping nut 98 under the plate or spider 74. Also, in this form the liquid director 58 is extended above the lower terminal 42 so that the initial motion of the liquid director tends to project the arc extinguishing fluid directly into the chamber onto the arc after the terminal 42 has left the lower end of the tube 86. This may be further extended if desired to insure that the liquid will be driven into contact with the arc at a relatively high velocity for a longer part of the travel of the liquid director. It does tend, however, to slow down the downward motion of the parts due to the restricted outlet of the liquid director.

The lengthening of the liquid director 58 performs another important function, and that is, it interposes a definite solid dielectric between the terminal 42 and the lower end of ferrule 36. The arc is sometimes extinguished on light overloads. In such case the terminal may not have descended far enough to prevent the recovery voltage of the line from puncturing the glass sleeve 38 by a disruptive discharge from the terminal 42 to the lower end of the ferrule 36 below the end of tube 86. The lengthening of the liquid director interposes a solid dielectric which prevents such puncture.

The tube 86 which, as usual, is inserted in the bore of the ring 80 with a light press fit has the upper end of its bore flared outwardly to permit freer movement of the fluids after they pass the stud 40, so long as the same is in place.

For different effects in regard to time current characteristics and ratings the liquid level may be carried at any one of the three points indicated. The chilling effect of the liquid upon the fuse 43, if the level is carried at the line A, is such as to tend to increase the capacity of the fuse for short overloads. This effect may be reduced by dropping the level to B or substantially eliminated by dropping the level of the liquid below that of the fuse at the line C. The liquid director is preferably made in each case of a fiber tube impregnated with a suitable condensation product, such as one composed of phenol and formaldehyde and the tube 86 is preferably a wrapped fiber tube impregnated with a condensation product or some other binder.

In the form shown in Figure 9 the initial explosion is substantially within the confines of the ferrule and the upper end of the glass tube, the position of which part is indicated in the figure. Where the explosion is thus liable to occur under liquid and further down in the tube the glass tube is made heavier to withstand the stresses. The permissible initial pressure is thereby raised, with correspondingly increased arc extinguishing effect.

In the form shown in Figure 10 the fuse is carried higher in the chamber, substantially as shown in Figure 4, the liquid director and the terminal 42 being made longer than in the form shown in Figure 4 and telescoping with the tube 86 to a greater extent. This form provides a two-stage operation, the first being capable of stopping low overloads without blowing off the cap. If the overload is so great as not to be capable of interruption by this action, then the second stage, i. e., the removal of the cap, the projection of an arc extinguishing material into the explosion chamber and into the arc, to sweep out of the housing the metallic vapors, etc., is called into play.

The forms shown in Figures 11 and 12 are adapted for rapid operation, a short length only of the fuse wire being provided and the strain wire being correspondingly reduced in length so as to bring the entire fuse very high with respect to the tube 86, which is now greatly shortened. The liquid director 58 is also shortened in length, particularly since the upper end of the lower terminal 42 extends up within the confines of the ring 80. The ring 80 is made of insulating material preferably a condensation product.

A plurality of passageways, preferably two or three in number, extend diagonally through the walls of the lower terminal 42 for the purpose of causing liquid from under the liquid director to be projected through the upper end of the bore of said terminal 42 to assist in extinguishing the arc.

Figure 12 shows a short form of fusible link longer than that shown in Figure 11 but substantially all disposed within the explosion chamber defined by the tube 86, this effect being secured by having the upper surface of the ring 80 carried up even with the shoulder 83 and the top of the tube 86 therefore brought up to substantially the same level, the upper end of the bore in the tube 86 being flared out to prevent obstructing the upper end of the same too greatly.

The holes such as 100 for directing liquid through the bore of the lower terminal 42 may be employed in each case; that is, in any of the forms shown herein. In Figures 11 and 12 I have shown the manner in which the lower threaded end of the lower terminal 42 may bind the upper end of the flexible conductor 46 so as to make a mechanical connection at this point to secure electrical conductivity. The socket 47 may, however, in each case be flattened upon the flexible conductor if desired to secure such conductivity.

In Figure 13 the tube 86 has a modified form by having its lower end constricted radially and the walls thereof thinner than above the constriction. The fusible link is disposed at the lower ends of the thicker walls and may be disposed well under the liquid as shown at levels A, B or C, or above the level of the liquid as indicated by levels D and E. The bore of the upper end of the tube 86 is larger than the bore at the constricted portion and this provides relatively free passage through the annular space between the upper elongated terminal 40 and the inner walls of the tube 86. Since the relatively large openings 97—97 are provided for the escape of pressure from below the tube defining the explosion chamber, the said tube 86 may be held in its seat more firmly than in the other forms previously described. In fact, the screws, such as 89, instead of merely holding the edge of the insulating washer over the flange on the upper end of the tube 86 may overhang such flange directly. In that event, in order to expel the tube 86 it would be necessary to shear off a part of the flange of the tube 86. In this embodiment it is intended to provide relatively free discharge of the vapors and gases into the space above the fuse, particularly where the level is carried below the fuse 43. The space above the liquid is compressible, and the space above the liquid forms a region into which gases and vapors may be driven by the superior pressure created by the arc.

In the form shown in Figure 14 the liquid level is intended to be carried above the fuse and the walls of the tube 86 are thickened above such level and are thinner below the liquid level. In both constructions of Figures 13 and 14 the liquid director 58 telescopes with the lower end of the tube 86. In the form shown in Figure 14 the upper end of the tube 86 is closed off by a cork ring 102 which fills the annular space between the elongated terminal 40 and the inner bore of the tube 86. Thereby the initial explosive effect is confined to a greater extent within the explosion chamber and a sharper blowing is the result. Also, the circulation of the liquid is prevented. The extension of the tubular liquid director 58 above the arcing terminal 42 serves the same purpose as explained in connection with Figure 9, that is, of interposing a solid insulating medium between the arcing terminal 42 and the lower end of the upper ferrule 36.

The form shown in Figure 18 is substantially like the form shown in Figure 14 except that instead of the cork washer 102 for confining and retarding the escape of fluid from the tube 86 the inner bore of the tube 86 above the fusible element is provided with corrugations formed by internal circumferential grooves 103, the grooves and lands thereof being approximately 1/32 of an inch in width and depth for the particular material here employed. Obviously, for materials of greater conductivity, the depth and/or width might be increased. This affords a restriction to the outflow of fluids past the elongated upper terminal 40. The upper end of the liquid director is chamfered off on its internal upper corner, as indicated at 104. The liquid director 58 extends up close to the tapered shoulder 105 thereby tending to prevent the explosion in the explosion chamber from escaping out around and under the end of the tube 86. It will be observed that the corrugated surface 103 lies within an enlarged portion of the tube 86 above the liquid level, and hence constitutes a part of the expansion chamber. This corrugated surface tends to give a large area for engagement with the vapors, liquid and gases, which are discharged upwardly into the expansion chamber, tending to cool the same relatively rapidly, and also to secure a thorough mixture of the same to assist in keeping down the pressure within the expansion chamber, so as to extinguish the arc on as high an overload as possible. The tube 86 in this construction is anchored as shown in Figure 15, also, to retain the tube 86 in place against all pressures except very violent ones.

The embodiment shown in Figure 17 is substantially like that shown in Figures 4 and 10 with the exception of the manner of holding the tube 86 in place by means of the pins 92. The tube 86 is shorter than that shown in either Figures 4 or 10 and open vents 88 are provided, otherwise the form shown in Figure 17 is not materially different from that shown in Figure 4. The pins 92 are preferably formed of a suitable condensation product or fiber impregnated with such condensation product.

In the form shown in Figure 16 the liquid director 58 serves the dual function of defining the explosion chamber 100 and its normal purpose of directing liquid onto the arc as the terminals are separated. The groove 60, by which the pins 62 engage the liquid director, is disposed in the tapered funnel shaped entrance 59 and the upper end of the stud 42 projects within the most restricted part of the bore of the liquid director 58. A ring 104 of fiber impregnated with a suitable condensation product or formed of a condensation product is seated in a counterbore and against the shoulder surrounding the upper end of the terminal 42. This tends to confine the explosive effect of the arc in an upward direction. The upper end of the liquid director 58 is further counterbored above the ring 104 and it embraces the fuse 43 and strain wire 44 and the lower end of the upper terminal 40 which is elongated to pass down thru the flat ring or washer 105 formed of a suitable condensation product and into the upper end of the bore of the liquid director 58. The insulating ring 105 is seated in a counterbore against the shoulder 106 and is held in place by a locking ring 107 which drops into a peripheral groove or recess above the said ring 105. The ring 107 may be made of a material of sufficient resiliency to spring into the groove and lock the flat ring 105 in place and it may be made of such material as will permit the ring 105 to be expelled by shearing the ring 107 or projections therefrom which drop into the groove in case of excessive pressure within the fuse casing. The level may be carried above or below the fuse 43 or may be carried considerably below the fuse as indicated by the line C. Where the level of liquid is carried above the bottom of the liquid director 58 the ring 104 may be omitted, although it serves to prevent circulation of liquid.

As shown in Figure 20 a flanged cup-shaped member 109 may take the place of the ring 80 and tube 86. However, it is desirable to retain the releasable bushing 110 which corresponds in some degree to the tube 86 particularly as shown in Figure 11 inasmuch as the member 109 may be made of metal. The function of the cup portion 112 of the member 109 is to resist the initial shock and heat of the blowing of the fuse. The cup portion 112 is joined by a flaring shoulder portion 113 to the cylindrical flange portion 114 which is threaded into the threaded bore 79 of the ferrule 36.

The insulating bushing 110, which may be made of a suitable condensation product, has a push fit in the lower end of the cup member 112 and the lower fuse terminal 42 projects through the opening in said bushing 110. The fuse and strain wires in this case are shown as relatively short and the upper terminal 40 is shown as elongated in order to project down into the cup portion 112. A filling of granulated cork is confined within the cup portion 112 and is held in place by a split ring 115 which may be made of a suitable condensation product or the like to hold the cork in place. A plurality of vents or openings 116 extend through the wall 113 to permit the escape of fluid pressure from the interior of the fuse casing as the lower terminal 42 is drawn down into the liquid. The lower terminal 42 is provided with the liquid director 58 and serves its purpose of directing a stream of liquid past the end of the lower terminal 42 in order to quench the arc.

The cork filling 117 forms a heat insulating medium and furthermore keeps the liquid to some extent out of direct contact with the fuse and strain wires and thereby restricts the circulation of the liquid which tends to occur because of the heating effect of the fuse. The body of cork offers a resilient cushion which in the case of severe blowing is readily expelled, causing the upper terminal and the cap 39 to be discharged from the upper ferrule and as the lower terminal 42 descends the bushing 110 may be likewise expelled. The tendency then is for the arc to be lengthened and quenched. If the cup member 112 be of metal the arc may tend to persist between it and the lower terminal 42. Obviously, instead of a metal cup, the member 109 may be made of insulating material such as bakelite or of fiber.

Obviously, the filling of cork may be omitted and in a modification shown in Figure 21 the member 109 has no such filling. Also, the lower terminal 42 may dispense with the use of the liquid director 58 and that is shown in Figure 21. In fact, the liquid director may be omitted in any of the forms herein shown, but it has been found in general to be of a very considerable utility in utilizing substantially all of the liquid below it within its stroke, the same being caused to be discharged in proximity to the lower end of the arc and thereby having a greater effect in quenching and extinguishing the arc than would be the case if the terminal were merely drawn down through the liquid.

In Figure 19 I have shown a modified form in which the upper ferrule 36 is considerably elongated above the counter bore 82 in which the flange spring plate 74 is seated. This provides a chamber 119 which is preferably partially filled with liquid to the level indicated. The blowing of the fuse 43 occurs well below the level of the liquid. A metal plate 120 is clamped between the nut 75 and the plate 74 and this metal plate has a plurality of holes therethrough, through which extend the upper ends of tubes 122. The lower ends of the tubes which are preferably of bakelite or bakelized fiber are reduced in diameter and project through openings in the ring 123, which ring has a flange seating in the recess 124 and held in place by a spring ring 125 which expands into a groove 126.

The ring 123 is preferably of insulating material as is also the bushing 110. However, the ring 123 may be made of metal if desired. The tubes 122 thus provide an opening from below the ring 123 to the chamber 119 above the plate 120. The space between the spring plate or spider 74 and the ring 123 is preferably filled with granulated cork or the like for the purposes heretofore described.

The form here described is adapted to give a deactivating or deionizing effect, depending upon the severity of the overload and the resulting arc. On light overloads, the fusing of the fusible link within the body of granulated cork and liquid evolves a gaseous medium which tends to compress the cork by pressure. Cork is quite resilient, and tends to confine the arc in small space, with rapid evolution of gas from its own substance, and from the liquid which lies in the interstices. Simultaneously, the length of the arc is increased. The quick release of gaseous medium and the resilient pressure of the cork are effective to extinguish arcs. However, the quick development of pressure and the difficulty of escape for the gas through the body of wet cork, upon arcs of greater severity, tend to drive the cork in all directions. If the overload is so severe that there is a severe blowing of the fuse the tendency is first to expel the upper terminal 40 and its plates 74 and 120 through the liquid in the chamber 119 tending to force the cap 39 away and to discharge the cork out of the open end of the ferrule. As the terminal 42 descends, pressure within the tube casing below the ring 123 will tend to escape through the tubes 122 and if the pressure is too great the bushing 110 may be driven out and finally, if necessary, the ring 123 with the tubes 122. Since the tubes 122 have merely a press fit in the ring 123 they may be expelled by pressure before the ring 123 is driven out. As the terminal 42 descends the liquid director 58 performs its usual function in directing the liquid onto the arc.

In the forms shown in Figures 19 and 20, it will be observed that the fuse is confined in a substantially closed explosion chamber in which the arc may be extinguished, if not of too great severity. If the arc is so severe as to exceed the interrupting capacity of the explosion chamber, then the same is vented into the space such as the chamber 119, in Figure 19, which acts as an expansion chamber for containing, cooling and condensing the gases and vapors driven upwardly by the arc. The application of arc extinguishing material continues throughout both stages of action upon the arc.

It will now be seen that the time overload characteristic of the fuse may be controlled by the factors heretofore described. These controlling features are, first, the control of time by varying the length of the fuse wire; next, by varying the character of the surrounding medium; next, the submergence of the fuse partially or wholly with respect to the arc extinguishing liquid, spring tension and other factors.

I believe that I am the first to coordinate the time overload characteristics of fuses in a system so that their performance could accurately be predetermined. Also, I consider that I am the first to have taught the art how to increase the time interval between the application of an overload and the blowing of the fuse, so that under normal conditions the fuse on the high tension side of a distribution system will not blow until after an oil circuit breaker on the low tension side of the system has had an opportunity to open.

I employ the terms "high tension" and "low tension" sides as designating lines or conductors as being of greater importance and less importance, respectively, in a distribution system. The voltage is not of significance by itself; the significant feature is that a fuse through which flows power for a relatively large distribution will not be blown and opened before a circuit breaker, through which passes less power and serves a less area of distribution, has had an opportunity to disconnect the fault.

I believe it is broadly new with the present invention to provide a progressive system of release of internal pressure as the center of the pressure disturbance moves downwardly in the fuse casing.

It will be apparent to those skilled in the art that I do not intend to be limited to the specific details shown and described, as the teachings of my invention are broader than the specific embodiments.

I claim:

1. In combination, a tubular casing having a releasable end wall, a transverse partition across the casing adjacent the releasable end wall, a tube mounted in the partition and providing an opening therethrough, a terminal adjacent each end of the tube, a fusible link between the terminals disposed in the tube, spring means for drawing one of the terminals away from the tube, and means holding the tube in the partition with a predetermined grip to permit the tube to be expelled from the casing upon the occurrence of excessive pressure in the casing.

2. In combination, a tubular casing having a releasable end wall, a transverse partition across the casing adjacent the releasable end wall, a tube mounted in the partition substantially coaxial with the casing and providing an opening therethrough, said tube being releasably held in the partition and the partition having vent openings therethrough, terminals adjacent each end of the tube, a fusible link between the terminals disposed in the tube, and a spring for moving one of the terminals.

3. In combination, a stationary terminal, a relatively movable terminal, said terminals having longitudinal bores and cross bores, pins disposed in said cross bores, said pins having circumferential grooves at their intermediate portions in register with the longitudinal bores, and a conductor having loops embracing the pins, said loops engaging in the grooves to form a free articulation between said pins and said conductors.

4. In combination, a relatively stationary terminal, a relatively movable terminal, said terminals having longitudinal bores and cross bores, pins disposed in said cross bores, said pins having circumferential grooves at their intermediate portions in register with the longitudinal bores, a conductor of relatively high mechanical strength having loops embracing the pins and engaging in the grooves to provide articulation between said pins and said conductor, and a readily fusible link having its ends rigidly connected to the terminals.

5. In combination, a relatively stationary terminal, a relatively movable terminal, said terminals comprising tubular metallic members, a metallic stress sustaining connection between the terminals, the ends of said connection having articulate anchorage to said terminals, said anchorage being disposed in the bores of the terminals, a readily fusible link having its ends rigidly connected to the terminals and having an intermediate portion disposed in a coil about but out of contact with said stress sustaining member.

6. In combination, a tubular casing having a releasable end wall and having a metallic ring under said end wall, said ring having a bore terminating in a shoulder, a transverse plate having resilient arms extending longitudinally of said bore and resting on the shoulder, a terminal mounted centrally of said plate, a fusible element connected to said terminal, a movable terminal connected to the other end of the element, and means for retracting said latter terminal to increase the distance between said terminals upon fusing of the element, and a tubular bushing surrounding the fusible element, and supported by said ring independent of said plate.

7. In combination, a tubular casing having a releasable end wall and having a metallic ring under said end wall, said ring having a bore terminating in a shoulder, a transverse plate having resilient arms extending longitudinally of said bore and resting on the shoulder, a terminal mounted centrally of said plate, a fusible element connected to said terminal, a movable terminal connected to the other end of the element, and means for retracting said latter terminal to increase the distance between said terminals upon fusing of the element, a tubular bushing surrounding the fusible element, and means for supporting the tubular bushing on said ring.

8. In combination, a tubular casing having a releasable end wall and having a metallic ring under said end wall, said ring having a bore terminating in a shoulder, a transverse plate having resilient arms extending longitudinally of said bore and resting on the shoulder, a terminal mounted centrally of said plate, a fusible element, connected to said terminal, a movable terminal connected to the other end of the element, and means for retracting said latter terminal to increase the distance between said terminals upon fusing of the element, a tubular bushing surrounding the fusible element, means for supporting the tubular bushing on said ring, and frangible means holding said tubular member and said supporting means together.

9. In a fuse, the combination of a plate having a cylindrical flange, said flange being slotted to provide a plurality of radially resilient contact fingers, there being a central opening in the plate, a shouldered stud having a shank extending through said opening, and means for clamping the shoulder against one side of the plate.

10. In a fuse, the combination of a plate having a cylindrical flange, said flange being slotted to provide a plurality of radially resilient contact fingers, there being a central, non-circular opening in the plate, a shouldered stud having a non-circular shank extending through said opening and held against rotation with respect to the plate, and means on the shank clamping the shoulder against the plate, said stud having a longitudinally extending bore and a transverse pin intersecting said bore for supporting a stress sustaining member.

11. In a fuse, the combination of a plate having a cylindrical flange, said flange being slotted to provide a plurality of radially resilient contact fingers, there being a central, non-circular opening in the plate, a shouldered stud having a non-circular shank extending through said opening and held against rotation with respect to the plate, and means on the shank clamping the shoulder against the plate, said stud having a longitudinally extending bore, a transverse pin intersecting said bore for supporting a stress sustaining member, said stud having a longitudinally extending recess in which a fuse wire is adapted to be gripped.

12. In a fuse, the combination of a movable terminal member comprising a metal stud having a longitudinally extending bore, a transverse pin intersecting said bore, a stress sustaining member anchored to the central part of the pin, said stud having a longitudinal slot opening on its outer periphery, a fuse wire disposed in said slot and the edges of the slot being battered over to pinch the fuse wire.

13. In a fuse, a coupling member comprising a cylindrical head, said coupling member having a longitudinal bore and having a threaded socket in the upper end thereof, the lower end of the bore forming a conductor socket for receiving a flexible conductor, a spring connecting ring having an inwardly extending flange embracing the head, said head having a shoulder under the flange, and a split ring embracing the head, said head having a groove above the flange for receiving the split ring.

14. In a fuse, the combination of a tubular casing having a releasable end wall and having a metallic ring under said end wall, a barrier ring mounted within the metallic ring, said barrier ring having a central bore and a counterbore providing a shoulder, a tubular bushing having a flange seated in said counterbore and a plurality of frangible plates mounted on the barrier ring and overhanging the flange to provide a releasable mounting for the bushing in the barrier ring.

15. In a fuse, the combination of a tubular casing having a releasable end wall and having a metallic ring under said end wall, a barrier ring mounted within the metallic ring, said barrier ring having a central bore and a counterbore providing a shoulder, a tubular bushing having a flange seated in said counterbore and a plurality of frangible plates mounted on the barrier ring and overhanging the flange to provide a releasable mounting for the bushing in the barrier ring, said barrier ring having a plurality of openings therethrough and yieldable means for obstructing said openings.

16. In combination, a tubular casing having an end wall and having a metallic ring adjacent said end wall, a barrier ring embraced by and supported on said metallic ring, a tubular bushing of insulation carried in said barrier ring, a relatively stationary terminal connected to the metallic ring, a fuse supported in said bushing by said relatively stationary terminal, a movable terminal adjacent the end of said bushing and being connected to said fuse, a spring for retracting said movable terminal and a tubular liquid director embracing the lower end of the bushing and being mounted on the movable terminal.

17. In combination, a tubular casing having an end wall and having a metallic ring adjacent said end wall, a barrier ring supported by said metallic ring, a tubular insulating bushing carried in said barrier ring and releasably held thereby, a relatively stationary terminal connected to the metallic ring, a fuse supported in said bushing by said terminal, a movable terminal adjacent the end of said bushing and being connected to said fuse, a spring for retracting said terminal from said bushing, and a tubular liquid director substantially fitting the tubular casing and having a central passageway of greater diameter than the tubular bushing, said liquid director being carried by said movable terminal.

18. In combination, a tubular casing having an end wall and having a metallic ring adjacent said end wall, a barrier ring supported in the metallic ring, a tubular bushing of insulating material having one end mounted in the barrier ring, a relatively stationary terminal projecting into the tubular bushing, a relatively movable terminal extending into the other end of the bushing and a fuse disposed wholly within said bushing connecting said terminals.

19. In combination, a tubular casing having an end wall and having a metallic ring adjacent said end wall, a barrier ring supported in the metallic ring, a tubular bushing of insulating material having one end mounted in the barrier ring, a relatively stationary terminal projecting into the tubular bushing, a relatively movable terminal extending into the other end of the bushing and a fuse disposed wholly within said bushing connecting said terminals, a spring for retracting the movable terminal from the bushing and a liquid director carried by said movable terminal.

20. In combination, a tubular casing having a releasable end wall and having a metallic ring adjacent said end wall, a relatively stationary terminal member carried by and connected to the metallic ring, a barrier ring of insulation separately carried by the metallic ring, said terminal projecting through the barrier ring, a relatively movable terminal, a retracting spring for said movable terminal, a fuse between said terminals and a tubular member of insulation surrounding said fuse and protecting the tubular casing from the violence of the fuse.

21. In combination, a tubular casing having a releasable end wall, and a metallic ring under said end wall, a relatively stationary terminal, a spider mounted on said metallic ring and supporting said terminal, a barrier ring mounted on the metallic ring and embracing the lower end of the terminal, a relatively movable terminal, a spring for retracting the movable terminal, and a tubular member of insulation embracing the movable terminal and being carried thereby, defining an explosion chamber and serving, when the movable terminal is retracted, to operate as a liquid director.

22. In combination, a tubular casing having an end wall and having a metallic ring adjacent said end wall, means carried by the metallic ring defining an explosion chamber, terminals projecting into said explosion chamber, a fuse between the terminals, one of the terminals being movable, a spring for retracting said movable terminal said casing having a normally closed discharge outlet, and means for progressively opening said discharge outlet from the casing as the pressure within the casing increases.

23. In combination, a tubular casing having a releasable end wall and having a metallic ring adjacent said end wall, a spider having resilient engagement with the ring, a relatively stationary terminal carried by the spider, means carried by the metallic ring for defining an explosion chamber within the casing, a movable terminal, a fuse within the explosion chamber connected between said terminals, a spring for retracting the movable terminal upon blowing of the fuse, and a filling of granulated cork in said explosion chamber.

24. In a fuse of the class described, the combination of a fuse casing containing an arc extinguishing fluid, a pair of fuse terminals, a fusible link between them, a spring for moving one of the terminals, an explosion chamber open at both ends and laterally enclosing the fuse, and means in said chamber to retard the circulation of the arc extinguishing liquid through the chamber because of the heating thereof by the fuse.

25. In combination, a tubular casing, a tubular explosion chamber fixedly disposed coaxially in the casing, a fusible link in the explosion chamber, terminals for the link disposed at opposite ends of said chamber, one end of said chamber being open, the other end of the chamber being substantially closed by the adjacent terminal and means for separating the terminals upon fusing of the link.

26. In combination, a relatively stationary terminal, a relatively movable terminal, a fuse connected between said terminals, means defining a chamber about said fuse, a non-fluid non-conducting material packed in said chamber, means for retracting said movable terminal when said fuse melts and means for directing an arc quenching fluid over said terminal when it is retracted.

27. In combination, a casing containing an arc quenching liquid, means defining a chamber in said casing, a fuse in said chamber, a relatively stationary terminal and a relatively movable terminal secured to the ends of said fuse, a non-fluid non-conducting material in said chamber wet with said liquid, said material being driven out of one end of the chamber upon blowing of the fuse, and means for retracting said movable terminal and drawing it through said liquid when said fuse melts.

28. In combination, a stationary explosion chamber of rigid material comprising a restricted tubular passageway, fuse terminals, a fuse connecting said terminals, one of said terminals extending into said passageway and being adapted to be retracted therethrough upon blowing of the fuse arc extinguishing material within the chamber adapted to be acted upon by the arc formed on blowing of the fuse to drive metallic vapors out of said bore, a spring chamber toward which said retractible terminal is adapted to be moved disposed at one end of said explosion chamber, a spring in said chamber and being connected to said retractible terminal, and a second chamber communicating with the other end of the explosion chamber, and being closed off from atmosphere to receive the metallic vapors blown out of the bore by said arc extinguishing material.

29. In combination, a fusible link, two terminals, an arc extinguishing material, means for withdrawing one terminal into this material upon blowing of the fuse, and a fixed restricting passage of a diameter larger than that of said one terminal for the flow of the fluid resulting from the action of the arc upon the arc extinguishing material.

30. In combination, a fusible link, two terminals, an arc extinguishing material, means for withdrawing one terminal into this material upon blowing of the fuse, a fixed restricting passage defined by rigid tubular walls for confining the arc formed on blowing of the link, said passage controlling the flow of the fluid resulting from the action of the arc upon the arc extinguishing material, and a chamber adapted to receive and permit expansion and cooling of said fluids driven through said passage.

31. In combination, a fusible link, two terminals, an arc extinguishing material, means for withdrawing one terminal into this material upon blowing of fuse to subject said material to the arc, a stationary explosion chamber of rigid material surrounding the arc caused upon blowing of the link and constituting a fixed restricting passage for the flow of the fluid resulting from the action of the arc upon the arc extinguishing material, and a chamber communicating with the explosion chamber adapted for expansion and cooling of these fluids.

32. In combination, a fusible link, two terminals, an arc extinguishing material, means for withdrawing one terminal into this material upon blowing of the link, and there being a restricting passage between the terminals and having one end open for the flow of the fluids resulting from the action of the arc upon the arc extinguishing material in the passage, this restricting passage having a gradually decreasing area to promote velocity of fluid flow into and around the arc.

33. In combination, a fusible link, two terminals, an arc extinguishing material, means for withdrawing one terminal into this material upon blowing of the fuse, and a restricting passage between the terminals and having one end open for the flow of the fluid resulting from the action of the arc upon the arc extinguishing material in the passage, one end of this restricting passage having a gradually increasing area to facilitate fluid flow around and away from the arc.

34. In combination, a fusible link, two terminals, an arc extinguishing material, means for withdrawing one terminal into this material upon blowing of fuse, and means providing a restricting passage for the flow of fluid resulting from the action of the arc upon the arc extinguishing material, said means automatically regulating the pressures and velocities resulting therefrom to correspond to arcs of varying magnitude for quenching the same.

35. In combination, a fusible link, two terminals, an arc extinguishing material, means for withdrawing one terminal into this material upon blowing of fuse, and means providing a restricting passage for the flow of the fluid resulting from the action of the arc upon the arc extinguishing material, said means providing varying restricting areas for quenching arcs of different magnitude.

36. In combination, a fuse, an arcing chamber surrounding the fuse, an arc extinguishing material, a chamber adjacent the arcing chamber having inwardly projecting fins, said chamber with said fins being adapted for expansion and condensing of the fluids evolved in the arcing chamber from the arc extinguishing material.

37. In combination, a fusible link, two terminals therefor, an arc extinguishing material subjected to the heat of the arc on blowing of the fuse, a fixed restricting passage in which the arc is formed for directing the flow of the fluid resulting from the action of the arc upon the arc extinguishing material, to sweep away from the arc the metallic vapor formed by volatilizing of the fusible link and to substitute in said passage an atmosphere of lower arc sustaining character, and a chamber at one end of said passage for receiving the metallic vapors swept out of the arc through said passage.

38. In combination, a casing, a stationary explosion chamber disposed in said casing, said casing being arranged to provide for relief of pressure in said chamber, means for supporting said chamber adjacent an end wall of said casing, said chamber having openings at opposite ends, terminals adjacent said ends, a fusible link in the chamber, arc extinguishing medium for producing a gaseous blast through said chamber, and spring means for separating the terminals upon melting of the fusible link.

39. In combination, a fuse casing, a fusible link, a pair of terminals for the same, means within the casing defining a chamber about said terminals and link, said chamber containing a mass of arc extinguishing material, said casing containing a spring chamber at one side of said first chamber, a spring in said spring chamber for moving one of said terminals away from the other, and an expansion chamber on the other side of the first chamber and into which said first chamber is adapted to vent upon formation of an arc therein.

40. In a fuse, the combination of relatively massive rodlike terminals, longitudinally extending grooves formed in the sides of said terminals at their adjacent ends, and a relatively slender fuse wire of soft metal having its end portions disposed in said grooves, the sides of the grooves being deformed into engagement with the fuse wire, the intermediate portion of said fuse wire being formed into a coil to provide flexibility.

41. In a fuse device, the combination of an elongated tubular fuse housing having a bore, means fixedly supported within said housing, said means comprising an explosion chamber having a bore of less diameter than said bore of the housing, fuse terminals within said housing, one of said terminals extending into the bore of the explosion chamber said bore being of a diameter not substantially less than the diameter of said one terminal, a fusible link connecting said terminals, said fusible link, upon blowing, forming a body of metallic vapor in said bore of the chamber, arc extinguishing material within said housing which is acted upon by the arc to evolve a gaseous medium and to drive out of said explosion chamber the metallic vapors resulting from the arc, and means for bringing said material within the influence of the arc.

42. In combination, a tubular casing having a metallic member at one end forming a terminal, a tubular member substantially closing off the bore of said tubular casing fixedly mounted on said metallic member, said tubular member having a bore forming an explosion chamber, a stationary fuse terminal mounted on said metallic member at one end of the explosion chamber, a relatively movable fuse terminal disposed at the other end of the explosion chamber, a fuse connecting said terminals, the fuse, upon blowing, forming an arc between said terminals within said bore, the first named end of said bore being open to permit a gaseous medium to pass therethrough, and arc extinguishing material adapted to be acted upon by said arc to liberate said gaseous medium which is driven out of said first named end of the bore of the explosion chamber, there being a chamber at the upper end of the bore for receiving the gaseous medium expelled from the bore.

43. In a high tension fuse, a stationary tubular arcing chamber of restricted diameter, fuse terminals associated with the arcing chamber and at least one of which extends into the arcing chamber, a fuse normally connecting said terminals, means for providing a deionizing agent in the chamber, and an expansion chamber into which one end of the tubular arcing chamber opens for the discharge of the metallic vapors of the fuse and the ionized gases of the arc from between the terminals.

44. In a high tension fuse, a stationary tubular arcing chamber of restricted diameter, fuse terminals associated with the arcing chamber and at least one of which extends into the arcing chamber, a fuse normally connecting said terminals, means for providing a deionizing agent in the chamber, an expansion chamber into which one end of the tubular arcing chamber opens for the discharge of the metallic vapors of the fuse and the ionized gases of the arc from between the terminals, and a pressure releasable wall for venting the expansion chamber when the pressure therein exceeds a predetermined value.

45. In a high tension fuse, a stationary tubular arcing chamber of restricted diameter, fuse terminals associated with said arcing chamber and at least one of which extends into the arcing chamber, a fuse normally connecting said terminals, means for providing a deionizing agent in the chamber, an expansion chamber into which one end of the tubular arcing chamber opens for the discharge of the metallic vapors of the fuse and the ionized gases of the arc from between the terminals, said expansion chamber providing an extensive metallic surface for extracting heat from the gases and vapors discharged from the arcing chamber to delay the rise of fluid pressure in said expansion chamber.

46. In combination, a fusible link having suitable terminals, stationary means for confining the explosion of the link when it is fused, said means comprising a rigid chamber, and a second chamber larger than the first chamber, adapted to communicate with the end of the first chamber for receiving the gaseous products of the arc evolved in the first chamber.

47. In a device of the class described, the combination of a fuse housing, a rigid tubular arcing chamber within said housing, a fuse link within the housing, fuse terminals within the housing, said terminals being so disposed that the arc following fusion of the link will be confined by said arcing chamber, said chamber being of an outside diameter substantially less than the inside diameter of the housing, arc extinguishing material adapted to be acted upon by the arc to evolve a gaseous medium which flows through said tubular arcing chamber and drives out of the same the metallic vapors of the arc, and a chamber communicating with the arcing chamber and adapted to receive the said metallic vapor and gaseous arc extinguishing medium evolved by the arc.

48. In a device of the class described, the combination of a fuse housing, a rigid tubular arcing chamber within said housing, a fuse link within the housing, fuse terminals within the housing, said terminals being so disposed that the arc following fusion of the link will be confined by said arcing chamber, said chamber being of an outside diameter substantially less than the inside diameter of the housing, arc extinguishing material adapted to be acted upon by the arc to evolve a gaseous medium which flows through said tubular arcing chamber and drives out of the same the metallic vapors of the arc, and a chamber communicating with one end of the arcing chamber and adapted to receive the said metallic vapor and gaseous arc extinguishing medium evolved by the arc, and spring means within said housing and disposed at the other end of the arcing chamber for separating said terminals to lengthen the arc and to bring more of the arc extinguishing material within the influence of the arc.

49. In a device of the class described, a relatively long sleeve of insulation, a metal ferrule embracing an end thereof and forming an external terminal, a relatively short annular insulating member fixedly supported on the ferrule within the end of the sleeve adjacent said ferrule, said member having a bore forming an arcing chamber, a movable fuse terminal having its end disposed substantially at the end of the arcing chamber, a fusible link disposed in said arcing chamber and being connected between said ferrule and said fuse terminal, said bore being large enough to provide free space about the fuse and arc extinguishing material disposed about said movable terminal below said arcing chamber.

50. In a device of the class described, a relatively long sleeve of insulation, a metal ferrule embracing an end thereof and forming an external terminal, a relatively short annular insulating member fixedly supported on the ferrule within the end of the sleeve adjacent said ferrule, said member having a bore forming an arcing chamber, a movable fuse terminal having its end disposed substantially at the end of the arcing chamber, a fusible link disposed in said arcing chamber and being connected between said ferrule and said fuse terminal, said bore being large enough to provide free space about the fuse arc extinguishing material disposed about said rod below said arcing chamber, and spring means for pulling said movable terminal down in the arc extinguishing material when the link is fused.

51. In a device of the class described, a sleeve of insulation, a metal ferrule embracing the sleeve and having an inwardly extending flange overhanging the end of the sleeve, an annular insulating member held in said sleeve by cooperation with said flange, said member having an axial bore forming an arcing chamber, a movable rodlike fuse terminal within the sleeve having its end lying adjacent the end of the arcing chamber, a fusible link in the arcing chamber connected between the ferrule and the rodlike terminal, and arc extinguishing material within the sleeve below the arcing chamber.

52. In a device of the class described, a sleeve of insulation, a metal ferrule embracing the sleeve and having an inwardly extending flange overhanging the end of the sleeve, an annular insulating member fixedly held in said sleeve by cooperation with said flange, said member having an axial bore forming an arcing chamber, a movable rodlike fuse terminal within the sleeve having its end lying adjacent the end of the arcing chamber, a fusible link in the arcing chamber connected between the ferrule and the rodlike terminal, arc extinguishing material within the sleeve below the arcing chamber, and means for moving the rodlike terminal away from the arcing chamber upon fusion of the link, whereby the arc is drawn down into the arc extinguishing material.

53. In a fuse, a tubular housing comprising a sleeve of insulation, a metallic cap on one end forming one external terminal, a metallic sleeve on the other end forming a second external terminal, a fixed rigid transverse partition within the housing dividing the housing into two main chambers, namely an expansion chamber and a spring chamber, said partition having a tubular passageway therethrough forming an arcing chamber as a third chamber, fuse terminals within the housing connected to said external terminals, one of said fuse terminals lying substantially within said arcing chamber and being relatively movable, the other of said fuse terminals being relatively stationary and lying substantially within said expansion chamber, a fuse link connecting said fuse terminals, said tubular passageway loosely embracing the fuse spring means within said spring chamber for moving said relatively movable fuse terminal away from said relatively stationary terminal to draw an arc within said arcing chamber, and arc extinguishing material within the housing adapted to be acted upon by the heat of the arc for deionizing the arc within said arcing chamber.

54. In combination, a relatively stationary terminal, a relatively movable terminal in alignment therewith, a spring for retracting said movable terminal, a tension sustaining link, between the terminals, a fusible link of greater length than the distance between the terminals electrically connecting said terminals, liquid arc extinguishing material having a level adjacent the upper end of said movable terminal, said link being coiled along its central portion around but out of contact with said tension sustaining link and having its end portion adjacent the movable terminal substantially parallel to the line of the terminals to minimize heat transfer between said fusible link and said arc extinguishing material.

55. In combination, a tubular fuse casing having a fixedly mounted transverse partition adjacent one end thereof, a tube of relatively small bore mounted in said partition and providing an opening therethrough, a fuse terminal adjacent each end of the tube, a fusible link in the tube and connecting said terminals, spring means for drawing one of said terminals longitudinally of said tube to produce separation of the terminals, and means for holding the tube in the partition with a predetermined grip releasable upon the occurrence of excessive pressure below the partition.

56. In a blast quenched fuse device of the class described, an outer sleeve of insulation, external metallic terminals on the ends of said sleeve for mounting the device in stationary circuit terminals, one of said external terminals providing an outlet for the products of the blowing of the fusible element, an annular member fixedly embraced within said one external terminal, a tubular arcing chamber supported by said annular member adjacent one end of the sleeve, a movable rodlike fuse terminal projecting into the arcing chamber, a fusible link connected at one end to the adjacent end of the rodlike terminal and at its other end in conductive relation to the said one external terminal, means for retracting the rodlike terminal, and means for producing a blast of arc extinguishing medium through the arcing chamber upon blowing of the link.

57. In combination, a tubular housing, a short tube of insulation disposed in the upper end of said housing, said tube having at its upper end a radially extending flange secured to the adjacent wall of the housing and substantially closing off the housing outside said tube, a body of liquid in the housing sealing the lower end of the tube, a lower movable terminal substantially closing the lower end of the bore of the tube, a spring for retracting said terminal, an upper relatively stationary terminal substantially in line with the lower terminal but leaving a free outlet for the upper end of the tube, and a fusible link connecting said terminals.

58. In a device of the class described, a tubular housing having a condensing chamber, a spring chamber and a movable arcing chamber between said other chambers, a movable fuse terminal carried with the arcing chamber, a relatively stationary fuse terminal, a fusible link disposed in the arcing chamber and connecting said terminals, said arcing chamber discharging the metal vapors formed upon blowing of the link into the condensing chamber, and a body of arc extinguishing material in said arcing chamber adapted to be acted upon by the arc to drive the metallic vapors from said arcing chamber into said condensing chamber.

59. In a device of the class described, a tubular housing, a pair of fuse terminals adjacent one end of the housing, a fuse link connecting said terminals, a tubular sleeve of insulation surrounding one terminal and forming an arcing chamber for the fuse, said sleeve loosely surrounding said one terminal but being fixedly connected thereto, a body of arc extinguishing liquid in the housing, and a spring for drawing said sleeve and its connected terminal into the body of liquid.

60. In a device of the class described, a tubular housing, a pair of fuse terminals adjacent one end of the housing, a fuse link connecting said terminals, a tubular sleeve of insulation surrounding one terminal and forming an arcing chamber for the fuse, said sleeve loosely surrounding said one terminal but being fixedly connected thereto, a body of arc extinguishing liquid in the housing, and a spring for drawing said sleeve and its connected terminal into the body of liquid, said sleeve providing an annular passageway about the one terminal for the projection of liquid into the arcing chamber as the sleeve and connected terminal are moved.

61. In a device of the class described, a tubular housing having a condensing chamber and a spring chamber, a wall dividing said chambers, said wall having a central aperture, a tube of insulation defining an arcing chamber adapted to provide communication between said other chambers, said tube being supported in the aperture in said wall, a movable terminal projecting into one end of the tube, a fusible link in said tube and being connected to said terminal, and an annular piston member fitting within said tubular housing and embracing the lower end of the tube, said piston member being coupled to said movable terminal.

62. In a device of the class described, a pair of terminals one of which is movable, the other of which is relatively stationary, a fusible link between them, a stationary tubular arcing chamber surrounding the link and having its lower end closed by said movable terminal, the other end permitting discharge of the products of the arc from the chamber, and a charge of arc extinguishing material in the arcing chamber.

63. In a fuse, terminals of relatively large diameter, a spring tending to separate said terminals, a stress sustaining wire connected coaxially to the terminals to prevent cocking of the terminals by the pull of the spring, a fuse wire of substantially greater length than the first wire coiled loosely about the first wire, said fuse wire having its ends rigidly connected to the ends of the terminals at points radially spaced from the axis of said terminals, and a tubular arcing chamber supported independently of the terminals, said chamber enclosing a part of said coil, said fuse wire being out of contact with both the bore of the chamber and the stress sustaining wire.

64. In a fuse, the combination of a pair of terminals at least one of which is movable, means tending to separate said terminals, a strain wire for preventing separation of said terminals, said wire having at its ends universal joint connections with said terminals for preventing sharp bending of said wire, and a fuse wire having its ends rigidly connected to said terminals and its intermediate portion formed into a loose helical coil, said coil providing flexibility which prevents sharp bending of the fuse wire.

65. In a device of the class described, a pair of terminals and a flexible fusible link comprising a tension sustaining element having loose pin joint connections with the terminals to provide limited universal motion, and a fusible element having rigid connections at its ends with said terminals, said latter element having its central portion coiled to provide flexibility.

66. A renewable unit for a fuse comprising a pair of cylindrical fuse terminals adapted to be disposed axially in alignment and having readily attachable and detachable coupling portions at their remote ends, an axially disposed stress sustaining link connecting the adjacent ends of the terminals, said link having a flexible coupling with each terminal permitting a limited degree of universal motion of the terminals relative to each other without kinking of the link, and a fuse wire rigidly attached at its ends to the adjacent ends of the terminals and having its intermediate portion formed into a coil to provide flexibility so that the fuse wire will not be kinked.

67. In combination, a fuse chamber comprising a rigid tubular casing, a fusible link therein, a fuse terminal projecting into the casing and substantially closing off one end thereof, a second fuse terminal substantially closing off the other end of said casing, said casing having its bore enlarged between the ends to provide space for arc extinguishing material, said fuse link connecting said terminals, and a charge of arc extinguishing medium within said chamber.

68. In a fuse, a main housing, a silver fuse in said housing, a chamber about said fuse for limiting the amount of free atmospheric air in contact with the fuse when it blows, and arc extinguishing material in said housing for producing a gaseous medium in said chamber which is driven into contact with the metallic vapor of the arc as soon as the arc is formed.

69. In a fuse, a main housing, a silver fuse in said housing, means in the housing forming a chamber of restricted volume about said fuse for limiting the amount of atmospheric air in contact with the fuse when it blows, an arc extinguishing material within the housing subjected to the arc to evolve a gaseous medium which fills the chamber, and means within the housing providing a second chamber into which the metallic vapors and ionized gases are driven from the first chamber by the gaseous arc extinguishing medium to remove said metallic vapors and ionized gases from the region of the arc.

70. In a fuse, a main housing, a silver fuse in said housing, a chamber about said fuse for limiting the amount of free atmospheric air in contact with the fuse when it blows, and arc extinguishing material in said housing for producing a gaseous medium in said chamber which is driven into contact with the metallic vapor of the arc as soon as the arc is formed, said material comprising a chemical element which, on forming the arc, combines with silver to produce a stable compound of low conductivity.

71. In combination, a stationary fuse chamber comprising a rigid tubular casing, a fusible link within the chamber, a relatively stationary fuse terminal at one end of the chamber, said one end of the chamber being closed, a relatively movable fuse terminal within said chamber and substantially closing off the other end of said chamber, said casing having its bore enlarged between the ends to provide space for arc extinguishing material, said fusible link connecting said fuse terminals, and a charge of arc extinguishing material within said chamber.

72. In a high tension fuse, a main fuse housing comprising an outer sleeve bearing external terminal connections, a substantially closed arcing chamber fixedly supported within said outer sleeve and adjacent one end thereof, terminals projecting into the chamber and having connection through a fusible conductor adapted to be blown by excessive current, one of said terminals being adapted to be expelled from the arcing chamber upon blowing of the fuse, and arc extinguishing material in the chamber which is discharged endwise out of the chamber in one direction only and longitudinally of the arc following the expulsion of said terminal.

73. In a high tension fuse, a main fuse housing comprising a sleeve and external terminals carried thereupon, a substantially closed stationary arcing chamber comprising a tubular sleeve fixedly supported in the main housing adjacent one end thereof, a pair of internal terminals projecting thereinto and having a fusible connection between them, a charge of granular arc extinguishing material in said chamber, said chamber having metallic side walls and insulating bushings between said terminals and said side walls, one of said terminals being expelled endwise out of the arcing chamber, and the granular material being discharged endwise of the resultant arc in one direction only upon blowing of the fusible connection.

74. In a fuse device, an outer sleeve having external contacts, a tubular arcing sleeve fixedly supported in the outer sleeve adjacent one end thereof, terminals associated with said arcing sleeve, at least one of said terminals projecting into the sleeve and being expellable therefrom, a charge of granular arc extinguishing material in said sleeve, said terminals having a fusible connection between them and being connected to the external terminals, fusing of said fusible connection producing a break in the connection between the external terminals and causing the expulsion of said expellable terminal and said arc extinguishing material through the resultant arc in one direction only, expulsion of said terminal producing a second break in the connection between said external contacts.

75. In combination, means for establishing an arc including two terminals, an arc extinguishing material, one of said terminals being movable into this material upon establishment of the arc, and a fixed restricting passage of a diameter slightly larger than that of said one terminal for the flow of the fluid resulting from the action of the arc upon the arc extinguishing material.

76. In combination, means for establishing an arc including two terminals, an arc extinguishing material, one of said terminals being movable into this material upon establishment of the arc, a fixed restricting passage defined by rigid tubular walls for confining the arc formed, said passage controlling the flow of the fluid resulting from the action of the arc upon the arc extinguishing material, and a chamber adapted to receive and permit expansion and cooling of said fluids driven through said passage.

77. In combination, means for establishing an arc including two terminals, an arc extinguishing material, one of said terminals being movable into this material upon establishment of the arc to subject said material to the arc, a stationary explosion chamber of rigid material surrounding the arc and constituting a fixed restricting passage for the flow of the fluid resulting from the action of the arc upon the arc extinguishing material, and a chamber communicating with the explosion chamber adapted for expansion and cooling of these fluids.

78. In combination, a fusible link, two terminals, an arc extinguishing material, means for withdrawing one terminal into this material upon blowing of the link, and there being a restricting passage between the terminals and having one end open for the flow of the fluids resulting from the action of the arc upon the arc extinguishing material in the passage, this restricting passage having a decreased area to promote velocity of fluid flow into and around the arc.

79. In combination, means for establishing an arc including two terminals, an arc extinguishing material, one of said terminals being movable into this material upon establishment of the arc, and there being a restricting passage between the terminals and having one end open for the flow of the fluids resulting from the action of the arc upon the arc extinguishing material in the passage, the open end of the passage having a portion with an area which gradually decreases away from the open end.

80. In combination, means for establishing an arc including two terminals, an arc extinguishing material, one of said terminals being movable into this material upon establishment of the arc, and a restricting passage between the terminals and having one end open for the flow of fluid resulting from the action of the arc upon the arc extinguishing material in the passage, the open end of the passage having a portion of an area which gradually increases toward the open end to facilitate fluid flow around and away from the arc.

81. In a circuit interrupter, the combination of an elongated tubular housing having a bore, means fixedly supported within said housing, said means comprising an explosion chamber having a bore of less diameter than said bore of the housing, arc drawing terminals within said housing, one of said terminals extending into the bore of the explosion chamber said bore being of a diameter not substantially less than the diameter of said one terminal, said arc drawn by said terminals forming a body of metallic vapor in said bore of the chamber, arc extinguishing material within said housing which is acted upon by the arc to evolve a gaseous medium and to drive out of said explosion chamber the metallic vapors resulting from the arc, and means for bringing said material within the influence of the arc.

82. In a device of the class described, a sleeve of insulation, a hollow metal terminal member at one end of the sleeve and having an inwardly extending flange overhanging the end of the sleeve, an annular insulating member held in said sleeve by cooperation with said flange, said member having an axial bore forming an arcing chamber, a movable rodlike fuse terminal within the sleeve having its end lying adjacent the end of the arcing chamber, a fusible link in the arcing chamber connected between the hollow metal terminal and the rodlike terminal, and arc extinguishing material within the sleeve beyond the fusible link.

83. In a device of the class described, a pair of terminals one of which is movable, the other of which is relatively stationary, a fusible link between them, a stationary tubular arcing chamber surrounding the link and having one end closed by said movable terminal, the other end permitting discharge of the products of the arc from the chamber, and a charge of arc extinguishing material in the arcing chamber.

84. In a high tension circuit interrupter, a tubular arcing chamber of restricted diameter, terminals associated with the arcing chamber and at least one of which extends into the arcing chamber, said terminals being connected in the circuit through the circuit interrupter and having an arc therebetween upon interruption of the circuit, means for providing a deionizing agent in the chamber, and an expansion chamber into which one end of the tubular arcing chamber opens for the discharge of the metallic vapors and the ionized gases of the arc from between the terminals.

85. In a high tension circuit interrupter, a tubular arcing chamber of restricted diameter, terminals associated with the arcing chamber and at least one of which extends into the arcing chamber, said terminals being connected in the circuit through the circuit interrupter and having an arc therebetween upon interruption of the circuit, means for providing a deionizing agent in the chamber, and an expansion chamber into which one end of the tubular arcing chamber opens for the discharge of the metallic vapors and the ionized gases of the arc from between the terminals, said expansion chamber providing an extensive metallic surface for extracting heat from the gases and vapors discharged from the arcing chamber to delay the rise of fluid pressure in said expansion chamber.

86. In a circuit interrupter, two terminals between which an arc is formed, means for withdrawing one terminal from the other terminal for lengthening the arc, arc extinguishing material adapted to be acted on by the arc as the terminal is withdrawn to give off arc extinguishing fluids, a stationary tubular chamber surrounding a portion of the arc, restricting it laterally, but permitting free flow of the fluids evolved from the arc extinguishing material longitudinally of the arc in a direction away from the receding terminal.

87. The combination of claim 86 wherein the withdrawing means retracts the said one terminal from said chamber to separate the terminal and the chamber for electrical disconnection after the arc is extinguished.

88. In a circuit interrupter, two terminals between which an arc is formed, means for withdrawing one terminal from the other terminal for lengthening the arc, arc extinguishing material adapted to be acted on by the arc as the terminal is withdrawn to give off arc extinguishing fluids, a stationary restricting tubular chamber surrounding a portion of the arc and through which fluids evolved from the arc extinguishing material may flow in a direction away from the receding terminal, and a condenser chamber closed to atmosphere into which these gases may flow.

89. In a circuit interrupter, two terminals between which an arc is formed, means for drawing one terminal into a liquid arc extinguishing material for lengthening the arc, a stationary restricting tubular chamber surrounding a portion of the arc and through which fluids evolved by the action of the arc may flow in a direction away from the receding terminal into a free expansion space.

90. The combination of claim 89 with a condenser chamber closed off from atmosphere communicating with said tubular chamber and providing said expansion space.

91. The combination of claim 89 wherein said means for drawing said one terminal carries the said one terminal far enough away from the tubular chamber to produce electrical disconnection of the chamber and said one terminal after the arc is extinguished.

92. In combination for use in a high tension fuse having a main fuse tube with an external contact terminal, an arcing chamber consisting of a tube of rigid insulating material of small diameter relative to the main fuse tube, a pair of relatively massive rodlike terminals arranged axially within the tube and adapted to be separated from each other on blowing of the fuse, a metallic stress sustaining connection between the terminals substantially on their axis, a fusible element having its ends rigidly connected to the terminals and having its intermediate portion disposed between the terminals but away from the interior walls of the tube, one terminal being guided by the tube but free to move in it, and a flexible lead attached to this one terminal for connection with said external contact terminal.

93. In a circuit interrupter, two terminals between which an arc is formed, means for separating the terminals to lengthen the arc, arc extinguishing material adapted to be acted on by the arc as the terminals are separated to give off arc extinguishing fluids, a stationary chamber surrounding a portion of the arc, restricting it laterally but permitting the flow of the arc extinguishing fluids longitudinally of the arc to help extinguish the arc, and means for further separating the terminals so that one of them is removed from the proximity of the chamber to prevent re-establishment.

94. In a high tension fuse, a pair of relatively massive terminals, a metallic stress sustaining member connecting the terminals substantially on their axis, and a fusible element having its ends rigidly connected to the terminals and its intermediate portion disposed in a concentric coil around the stress sustaining member.

95. In a fuse, a relatively infusible terminal, a fusible element having one end extending into the terminals for anchorage thereto, the metal of the terminal being permanently deformed locally by a punch mark around the fusible element to insure electrical contact.

96. In combination in a fuse, a pair of relatively massive terminals having longitudinal bores, a fusible element between the terminals, said element entering said longitudinal bores in the terminals, said terminals being deformed by indentation or local compression to establish contact pressure on the fusible element at a point or points spaced away from the ends of the terminals facing the fusible element.

97. In combination in a circuit interrupter, a container for liquid, a tubular arcing chamber disposed at the upper end of the container and stationarily supported in respect to the same, a lower movable terminal extending into the bore of the chamber, a cooperating upper terminal adjacent the upper end of the chamber, an arc being adapted to be formed between said terminals, the bore of said chamber being of a diameter not less than that of the lower terminal, a body of liquid in said container with the level thereof disposed adjacent the upper end of the lower terminal, and means for moving the lower terminal downwardly in the liquid to extend the length of the arc, said chamber serving as a stationary restricting discharge passageway for the products of the arc.

98. The combination of claim 97 in which the terminals are normally connected by a fusible link.

99. In a fuse, a main tube having terminal contacts, a fuse link in said tube connecting said terminal contacts; said link comprising terminals, a fusible portion interconnecting said terminals, and a flexible lead attached to one terminal; an arcing tube surrounding said fusible portion and said one terminal, and an arc extinguishing material within said arcing tube and adapted to act upon the arc established therein.

NICHOLAS J. CONRAD.